(12) United States Patent (10) Patent No.: US 8,899,813 B2
McCollum et al. (45) Date of Patent: Dec. 2, 2014

(54) LIGHTING ASSEMBLY WITH CONFIGURABLE ILLUMINATION PROFILE

(75) Inventors: Timothy A. McCollum, Avon Lake, OH (US); Robert M. Ezell, Brunswick, OH (US); Jeffery R. Parker, Richfield, OH (US); Kurt R. Starkey, Strongsville, OH (US); Ian Hardcastle, Sunnyvale, CA (US); Fumitomo Hide, San Jose, CA (US)

(73) Assignee: Rambus Delaware LLC, Brecksville, OH (US)

( * ) Notice: Subject to any disclaimer, the term of this patent is extended or adjusted under 35 U.S.C. 154(b) by 323 days.

(21) Appl. No.: 13/558,917

(22) Filed: Jul. 26, 2012

(65) Prior Publication Data

US 2013/0033900 A1 Feb. 7, 2013

Related U.S. Application Data

(60) Provisional application No. 61/515,460, filed on Aug. 5, 2011.

(51) Int. Cl.
*F21V 7/04* (2006.01)
*G09F 13/02* (2006.01)
*F21V 8/00* (2006.01)
*F21Y 101/02* (2006.01)
*F21S 8/04* (2006.01)

(52) U.S. Cl.
CPC .............. *G02B 6/0036* (2013.01); *G09F 13/02* (2013.01); *F21Y 2101/02* (2013.01); *F21S 8/04* (2013.01); *G02B 6/0053* (2013.01); *G02B 6/0061* (2013.01)
USPC ............................ 362/612; 362/615; 362/618

(58) Field of Classification Search
USPC .................. 362/612, 618, 611, 615, 616, 617
See application file for complete search history.

(56) References Cited

U.S. PATENT DOCUMENTS

| | | | |
|---|---|---|---|
| 5,142,459 A | 8/1992 | Swarens et al. | 362/217 |
| 6,305,813 B1 | 10/2001 | Lekson et al. | |
| 7,277,609 B2 | 10/2007 | Cassarly | |
| 7,703,969 B2 * | 4/2010 | Miyashita | 362/607 |
| 7,771,091 B2 * | 8/2010 | Etori | 362/335 |
| 7,967,492 B2 * | 6/2011 | Nagasawa et al. | 362/618 |
| 7,997,780 B2 * | 8/2011 | Chang | 362/555 |
| 8,256,932 B2 * | 9/2012 | Chang | 362/339 |
| 2005/0219860 A1 | 10/2005 | Schexnaider | 362/601 |

(Continued)

FOREIGN PATENT DOCUMENTS

WO WO 2009-099547 8/2009 .......... G02F 1/13357

OTHER PUBLICATIONS

PCT Invitation to Correct Defects in the International Application dated Aug. 1, 2012 in International Application No. PCT/US2012/048257. 2 pages.

(Continued)

*Primary Examiner* — John A Ward
(74) *Attorney, Agent, or Firm* — Renner, Otto, Boisselle & Sklar, LLP

(57) ABSTRACT

A lighting assembly includes an edge-lit light guide and a light redirecting member. Light extracting elements at the light guide extract light from the light guide as intermediate light. Light redirecting elements at the light redirecting film are configured to redirect the intermediate light received from the light guide to illuminate a target surface in accordance with a defined illumination profile.

34 Claims, 13 Drawing Sheets

(56) References Cited

U.S. PATENT DOCUMENTS

2009/0002986 A1    1/2009  Medendorp, Jr. et al. .... 362/247
2009/0290344 A1   11/2009  Chiang et al. ................ 362/240
2010/0157615 A1    6/2010  Gruhlke
2010/0182802 A1    7/2010  Wang et al.
2011/0134362 A1    6/2011  Parker et al.

OTHER PUBLICATIONS

Response to Invitation to Correct Defects in the International Application dated Aug. 8, 2012 in International Application No. PCT/US2012/048257. 6 pages.

International Search Report and Written Opinion dated Jan. 21, 2013 in International Application No. PCT/US2012/048257 (13 pages).

* cited by examiner

OFFSET FROM TOP EDGE OF TARGET SURFACE
(x SIZE OF REGIONS IN Z-DIRECTION)

LIGHTING ASSEMBLY WITH CONFIGURABLE ILLUMINATION PROFILE

CROSS-REFERENCE TO RELATED APPLICATIONS

This application claims the benefit of U.S. Provisional Application Ser. No. 61/515,460, filed Aug. 5, 2011, the entire disclosure of which is incorporated herein by reference.

BACKGROUND

Conventional lighting assemblies for ceiling mounting are generally made without regard to where the lighting assemblies are to be placed in a room. Depending on location, the illumination such lighting assemblies produce may be uneven. An example is where a conventional ceiling-mounted lighting assembly is placed near a wall.

Some lighting assemblies are designed with the intent of producing a more-uniform illumination profile on a nearby surface, such as a wall. However, in most cases these lighting assemblies produce an illumination profile that is relatively bright in some areas of the surface and relatively dim in other areas of the surface.

Attempts have been made to improve the uniformity of the illumination profile by mounting the light source of the lighting assemblies above the ceiling with complex reflectors. However, these lighting assemblies are relatively large and require mounting space above the ceiling. Also they generally require a light source that emits light in all directions, making them unsuitable for using directional light sources such as solid-state light emitters (e.g., LEDs).

Interior designers also often use lighting to create visual effects within a room, including illuminating a surface, such as a wall, with a defined, non-uniform illumination profile. Lighting assemblies designed to illuminate a wall are typically called wall-wash lighting fixtures. These lighting assemblies generally employ a configuration similar to a linear array of can lights with one or more LEDs positioned in a lensed reflector housing. However, these lighting assemblies generally produce an uneven illumination profile that is relatively bright in some areas and relatively dim in other areas. In addition, the illumination profile of these lighting assemblies tends to be brighter in front of each can light and dimmer in between the can lights, producing a streaky illumination profile with brighter and dimmer bands.

It is also known to use relatively large two-dimensional grids of LEDs in ceiling-mounted lighting assemblies. However, this type of lighting assemblies suffers from similar illumination profile issues in addition to requiring a relatively large number of LEDs to implement.

DETAILED DESCRIPTION

Figure 1A:
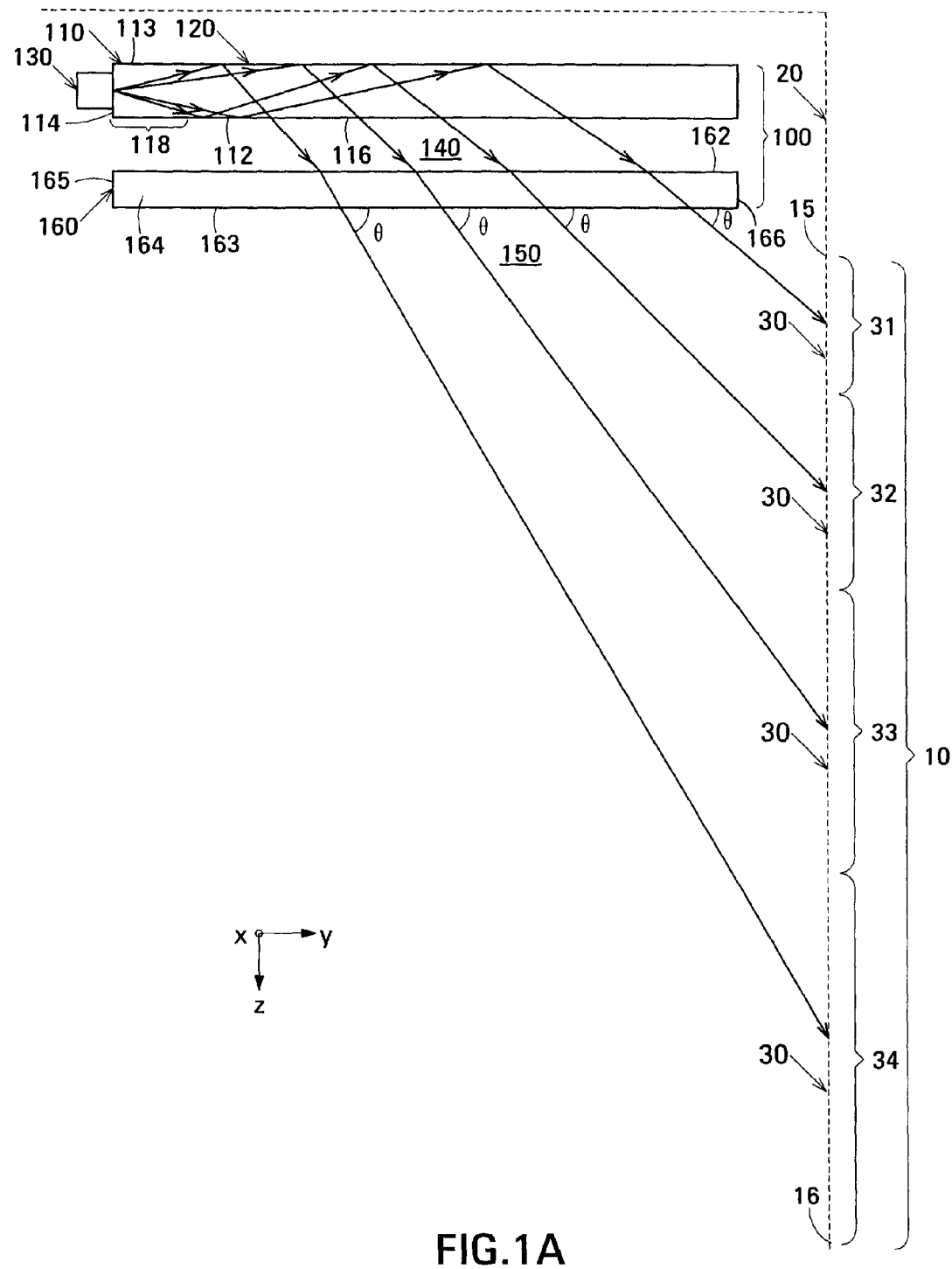
FIG. 1A is an exploded side view schematically showing an example of a lighting assembly embodiment located adjacent a ceiling and oriented to direct light onto a target surface on a nearby wall.

Embodiments will now be described with reference to the drawings, in which like reference numerals are used to refer to like elements throughout. The figures are not necessarily to scale. Figures that are described and/or illustrated with respect to one embodiment may be used in the same way or in a similar way in one or more other embodiments and/or in combination with one or instead of the features of the other embodiments.

As described in greater detail below, in some embodiments, a lighting assembly illuminates a target surface with a defined illumination profile. The lighting assembly has a light source, a light guide, and a light redirecting member. The light guide has a light output surface, a light input edge and includes light extracting elements. The light guide is edge lit by the light source. The light extracting elements are to extract light from the light guide through the light output surface as intermediate light. The intermediate light is directed away from the light input edge and the light output surface and has a maximum intensity at low ray angles relative to the light output surface.

The light redirecting member has opposed major surfaces and is positioned to receive the intermediate light. The light redirecting member includes light redirecting zones that include light redirecting elements at at least one of its major surfaces. The light redirecting elements within each of the light redirecting zones are configured to redirect a respective portion of the intermediate light incident thereon through a respective turning angle to produce respective output light portion having a defined angular spread. The output light portion is directed at a nominal output angle away from the light input edge and the light output surface of the light guide and towards a respective spatial region of the target surface such that the illumination profile on the target surface is the result of superposing the portions of the output light from all the light redirecting zones. The portion of the intermediate light directed into each spatial region by the respective light redirecting zone depends on the relative illuminance within the region, as defined by the illumination profile, and at least one of the output angle and angular spread of the respective portion of the output light.

FIG. 1A is a schematic exploded side view schematically showing an example of an embodiment 100 of a lighting assembly. FIG. 1A shows lighting assembly 100 mounted to illuminate a target surface 10 with a defined illumination profile. In the example shown, the target surface 10 is part of a larger surface 20. In another example, target surface 10 constitutes the entire surface 20. The illumination profile defines the variation of illuminance with location on the target surface in one or two dimensions. Illumination profiles include a nominally-uniform illumination profile, in which the illuminance is nominally the same over the entire target surface, an illumination gradient, in which the illuminance changes progressively from one end of the target surface to the other end of the target surface, or another variation of illuminance with location.

In the examples described herein, configurations of lighting assembly 100 that produce various illumination profiles are described in the context of an architectural lighting application in which target surface 10 is vertically oriented, and lighting assembly 100 is horizontally oriented and is mounted near the top of the target surface. In other applications, one or more of the orientation of lighting assembly 100, the orientation of target surface 10, and the mounting position of lighting assembly 100 are different from those exemplified.

The example of lighting assembly 100 shown in FIG. 1A includes a light guide 110, a light source 130, and a light redirecting member 160. Light guide 110 has major surfaces 112 and 113, a light input edge 114 and a light output surface 116 that constitutes at least part of major surface 112. Lighting assembly 100 is described herein with reference to a three-dimensional Cartesian coordinate system in which x- and y-directions lie in the plane of light output surface 116 and are respectively parallel and orthogonal to light input edge 114. The z-direction is orthogonal to the plane of the light output surface 116. Typically, target surface 10 is parallel to the x-z plane. In the x-direction shown in FIG. 1A, orthogonal to the plane of the drawing, light guide 110 is elongate and has a length approximately equal to the dimension of target surface 10 in the x-direction.

Light source 130 edge lights light guide 110. The light source is optically coupled to light input edge 114 such that light emitted by the light source enters the light guide and travels within the light guide by total internal reflection. The light travels generally in the y-direction. Light source 130 includes solid-state light emitters such as light-emitting diodes (LEDs), laser diodes, and organic LEDs (OLEDs). In an embodiment in which light source 130 includes LEDs, the LEDs may be top-fire LEDs or side-fire LEDs, and may be broad-spectrum LEDs (e.g., emit white light), LEDs that emit light of a desired color (e.g., red light, green light, blue light, or ultraviolet light), or a mixture of broad-spectrum LEDs and LEDs that emit monochromatic light of a desired color. In one embodiment, light source 130 emits light with no operably-effective intensity at wavelengths greater than 500 nanometers (nm), i.e., the light source emits light at wavelengths that are predominantly less than 500 nm. In such embodiments, phosphors (not shown) convert at least part of the light emitted by light source 130 to longer-wavelength light. Light source 130 may constitute part of a light source assembly (not shown) that also includes structural components (e.g., a printed circuit board (PCB)) (not shown) to retain light source 130 and to locate the light source relative to light guide 110. The light source assembly may additionally include circuitry, power supply and/or electronics for controlling and driving light source 130, a heat sink, and other appropriate components.

Figure 1B:
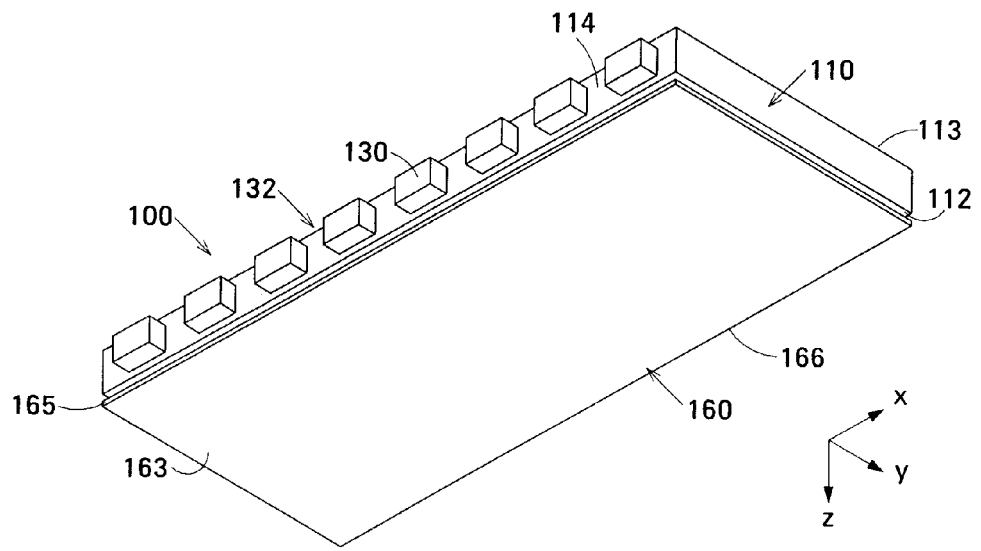
FIG. 1B is a schematic perspective bottom view showing the lighting assembly shown in FIG. 1A.

In the perspective view of lighting assembly 100 shown in FIG. 1B, a light source assembly 132 includes light source 130 embodied as LEDs arrayed in the x-direction in a spaced-apart relation along light input edge 114. Light from light source 130 enters light guide 110 through the light input edge and propagates in the y-direction along the light guide by total internal reflection at major surfaces 112 and 113. The LEDs are coupled to the light input edge in different ways. In some examples, the LEDs are potted, bonded or integral with the light input edge. In other examples, the LEDs are mounted at a small, defined distance from light input edge 114. The LEDs may be controllable separately or in unison to increase or decrease the intensity and/or change the color of the light input to the light guide. In some embodiments, light input edge 114 includes at least one faceted or curved surface (not shown) to redirect or change the distribution of the light from the LEDs as the light enters the light guide.

In the example shown in FIG. 1A, a transition region 118 is located between light input edge 114 and the light output surface 116 of light guide 110. In transition region 118, the light from light source 130 spreads laterally, and light of the same color or different colors from the LEDs constituting the light source mixes before the light reaches the light output surface 116. Transition region 118 may be integral with light guide 110, as shown in FIG. 1A, or may be a separate component (not shown) bonded to the light guide to eliminate any air gaps between the transition region and the light guide. Alternatively, transition region 118 may be embodied in a separate component (not shown) that is not bonded to the light input edge 114 of light guide 110.

In the example shown, light extracting elements 120 (not individually shown in FIG. 1A) are located in or on major surface 113 for extracting light from the light guide 110 through the light output surface 116 as intermediate light 140. In other examples, light extracting elements 120 are in or on major surface 112, both major surfaces 112 and 113 of light guide 110, in or on one or more selected areas of one or both major surfaces 112 and 113, or beneath one or both major surfaces 112, 113. Light extracting elements 120 are configured such that intermediate light 140 is directed away from light input edge 114 and light output surface 116, as shown in FIG. 1A. Accordingly, when lighting assembly 100 is mounted with the light guide 110 non-parallel to target surface 10 and with light input edge 114 remote from the target surface, as exemplified in FIG. 1A, intermediate light 140 is directed towards the target surface.

Figure 2:
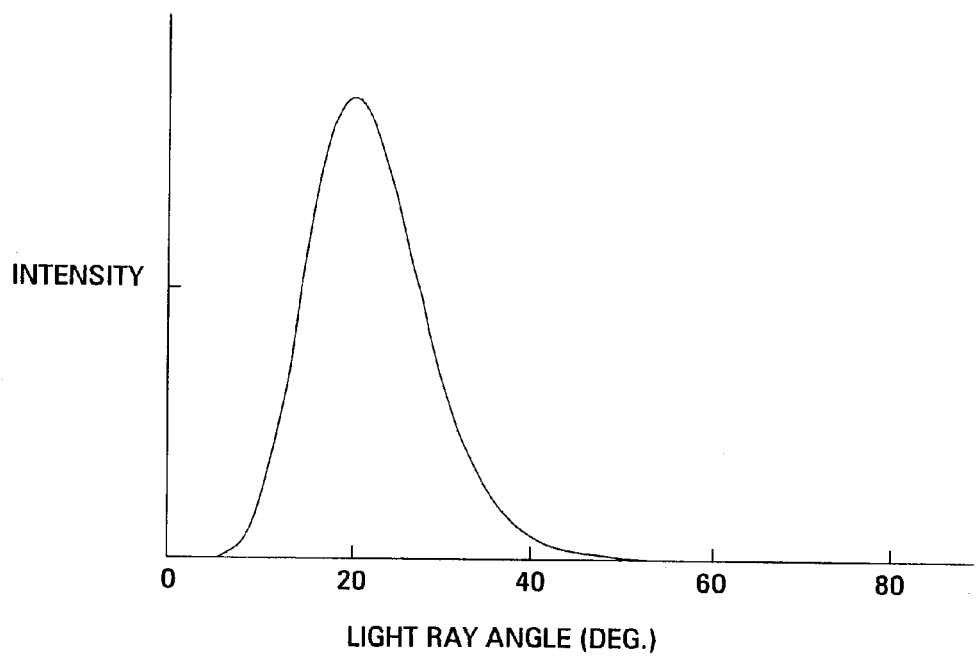
FIG. 2 is a graph showing an example of the light ray angle distribution of the intermediate light extracted from the light guide of the lighting assembly shown in FIG. 1A.

Light extracting elements 120 are further configured such that intermediate light 140 is output through the light output surface 116 of light guide 110 at low ray angles. Low ray angles are ray angles directed away from light input edge 114 and are predominantly at less than 45 degrees relative to light output surface 116. FIG. 2 is a graph showing an example of the light ray angle distribution of intermediate light 140. Light ray angle distribution refers to the variation of intensity with ray angle (typically a solid angle) of light emitted from a light-emitting region such as light output surface 116. In the example shown, the light ray angle distribution has a maximum intensity at light ray angles of about 20° relative to light output surface 116, and a substantially zero intensity at light ray angles of zero and greater than 40° relative to light output surface 116.

Light extracting elements 120 that are in, on or beneath a major surface 112, 113 will be referred to as being "at" the respective major surface 112, 113. Each light extracting element functions to disrupt the total internal reflection of the light propagating through light guide 110 that is incident on the light extracting element. In one embodiment, light extracting elements 120 at major surface 113 reflect light toward opposing major surface 112 so that the light exits light guide 110 through opposing major surface 112. In another embodiment, light extracting elements 120 at major surface 112 transmit light through the light extracting elements and out of major surface 112. In another embodiment, light extracting elements 120 are at both major surfaces 112, 113.

Figure 3:
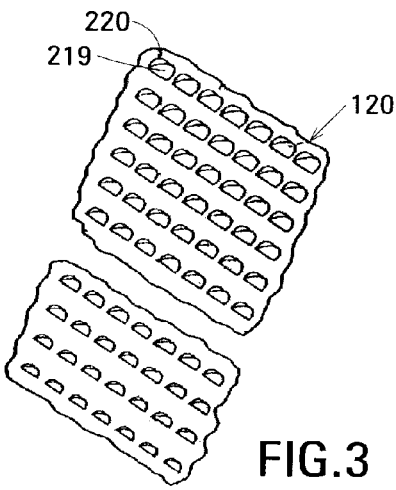
FIGS. 3 and 4 are enlarged schematic perspective views showing portions of one or both major surfaces of the light guide of the lighting assembly shown in FIG. 1A showing the shapes of exemplary light extracting elements at such major surfaces.
Figure 4:
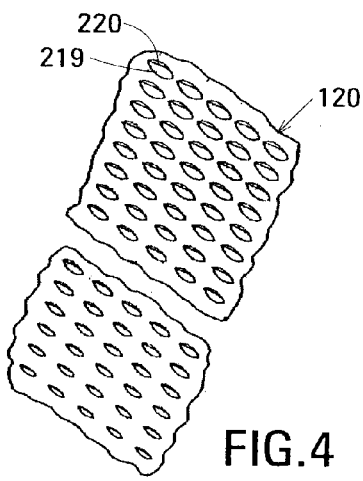

FIGS. 3 and 4 are enlarged views showing examples of light extracting elements 120 at a small region of the major surface 113 of light guide 110. In the examples shown, the light extracting elements have only two surfaces 219 and 220. In the example shown in FIG. 3, surface 219 is flat and surface 220 is curved, whereas in the example shown in FIG. 4, both surfaces 219 and 220 are curved.

In some embodiments, light extracting elements 120 vary depending on their location relative to light source 130 (and the individual light emitters that constitute light source 130) in one or more of size, shape, depth or height, density, orientation, slope angle, and index of refraction to extract light from light guide 110 with a standardized intensity profile, for example, a uniform intensity profile, and a standardized light ray angle distribution. Intensity profile refers to the variation of intensity with position within light output surface 116. A standardized intensity profile and a standardized light ray angle distribution allow interchangeable light redirecting members 160 (which will be described in detail below) to be designed in accordance with the standard. Interchangeable light redirecting members 160 allow lighting assemblies 100 having a common light guide 110 and light source 130 to be configured to illuminate different configurations of target surface 10 and/or to provide different illumination profiles. Examples of different configurations of target surface 10 include target surfaces having different dimensions in the z-direction, target surfaces in which the top edge 15 of the target surface is at a different distance in the z-direction from the lighting assembly and/or target surfaces at different distances in the y-direction from the lighting assembly. In other embodiments, light extracting elements 120 vary depending on their location relative to light source 130 in one or more of size, shape, depth or height, density, orientation, slope angle, and index of refraction to extract light from light guide 110 with an intensity profile and light ray angle distribution customized to a particular embodiment of light redirecting member 160. In yet other embodiments, light extracting elements 120 do not vary depending on their location relative to light source 130 to provide an intensity profile in which the intensity decreases with increasing distance in the y-direction from light source 130.

Light redirecting member 160 is located adjacent and parallel to the major surface 112 of light guide 110 to receive intermediate light 140 extracted through the light output surface 116 of the light guide. Light redirecting member 160 is separated from light guide 110 by a gap that prevents the light redirecting member from disrupting total internal reflection at the major surface 112 of the light guide. Light redirecting member 160 redirects portions of intermediate light 140 incident thereon to illuminate respective regions 30 of target surface 10 with respective portions of output light 150 having respective intensities defined by the illumination profile. Light redirecting member 160 has a proximal edge 165 adjacent the light input edge 114 of light guide 110, a distal edge 166 remote from the proximal edge, a major surface 162 facing the light guide and a major surface 163 remote from the light guide.

Figure 5:
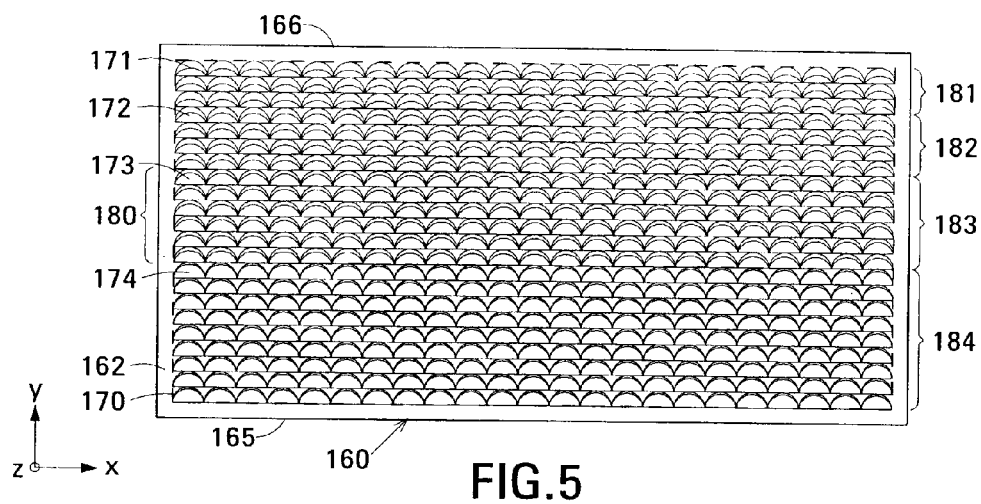
FIG. 5 is a plan view showing the major surface of a highly-simplified example of the light redirecting member of the lighting assembly shown in FIG. 1A.

FIG. 5 is a plan view showing the major surface 162 of a highly-simplified example of light redirecting member 160. The example of the light redirecting member shown includes light redirecting elements in or on major surface 162. Other examples have light redirecting elements in or on major surface 163, in or on both major surfaces 162, 163 or beneath one or both major surfaces of the light redirecting member. Light redirecting elements in, on or beneath a major surface of light redirecting member 160 are said herein to be "at" such major surface. An exemplary light redirecting element is shown schematically at 170. Reference numeral 170 will additionally be used to refer to the light redirecting elements collectively.

Referring additionally to FIG. 1A, light redirecting elements 170 are configured with different light redirecting properties to turn the intermediate light 140 incident on the light redirecting member through different turning angles to produce output light 150. The output light is directed at a nominal output angle away from the light input edge 114 and the light output surface 116 of light guide 110 towards a respective spatial region 30 of the target surface 10.

FIG. 5 shows light redirecting elements 170 that turn intermediate light 140 through the same nominal turning angle located in a respective light redirecting zone 180. For example, light redirecting elements 171 that turn intermediate light 140 through the same nominal turning angle are located in a light redirecting zone 181, and light redirecting elements 172 that turn intermediate light 140 through the same nominal turning angle different from that of light redirecting elements 171 are located in a light redirecting zone 182. The light redirecting elements 170 within each light redirecting zone 180 are configured to redirect a respective portion of intermediate light 140 incident on each light redirecting zone 180 through a respective turning angle to produce a respective portion of output light 150. The light redirecting elements in each light redirecting zone direct the respective portion of output light 150 at a respective output angle θ towards a respective region 30 of target surface 10, as shown in FIG. 1A. The illumination profile on the target surface 10 is the result of superposing the portions of output light output by all the light redirecting zones 180. The light redirecting zones 180 are configured such that the portion of the intermediate light 140 each directs towards the respective spatial region 30 of the target surface depends on the relative illumination within the region, as defined by the illumination profile, and either or both of the output angle and angular spread of the corresponding portion of the output light 150.

Examples of light redirecting elements 170 include features of well-defined shape, such as V-grooves, lenticular grooves, and features of well-defined shape that are small relative to the linear dimensions of light redirecting member 160, which are sometimes referred to as micro-optical elements. The smaller of the length and width of a micro-optical element is less than one-tenth of the size of light redirecting member 160 in the y-direction, and the larger of the length and width of the micro-optical element is less than one-half of the size of the light redirecting member in the y-direction. The length and width of the micro-optical element is measured in a plane parallel to the major surfaces 162, 163 of light redirecting member 160 for a flat light redirecting member 160 or along a surface contour for a non-flat light redirecting member 160.

Figure 6:
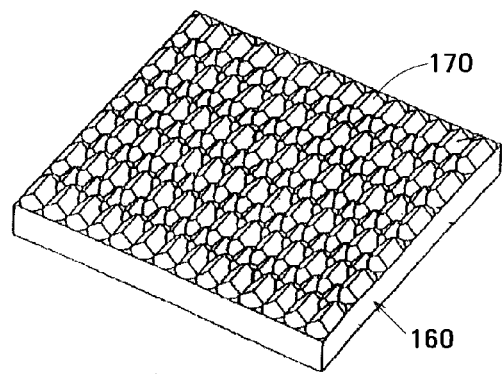
FIGS. 6 and 7 are enlarged schematic perspective views showing portions of one or both of the major surfaces of the light redirecting member of the lighting assembly shown in FIG. 1A showing the shapes of exemplary light redirecting elements at such major surfaces.
Figure 7:
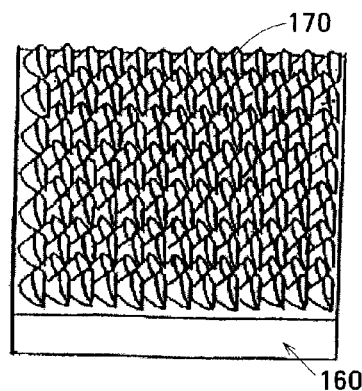

FIGS. 6 and 7 are enlarged views showing examples of light redirecting elements 170 at a small region of the major surface 162 of light redirecting member 160. In the examples shown, the light redirecting elements are small relative to the length and width of the light redirecting member 160. Also, in the example shown in FIG. 6, light redirecting elements 170 vary in size. Moreover, the relative percentages of light redirecting elements of different shapes or sizes may vary. In the example shown in FIG. 6, each of the light redirecting elements 170 has two planar sloped surfaces and two curved surfaces. In the example shown in FIG. 7, each of the light redirecting elements 170 has one sloped curved surface and one sloped planar surface. In other examples, the light redirecting elements vary in area density and refractive index. Other exemplary light redirecting elements are described in U.S. Pat. No. 6,752,505, and for the sake of brevity, will not be described in detail in this disclosure.

The slope angles of light redirecting elements 170 vary to vary the turning angles through which the light redirecting elements turn intermediate light 140 incident on the different light redirecting zones 180 of the light redirecting member to produce output light 150 directed away from the light input edge 114 and the light output surface 116 of light guide 110. In the example shown in FIG. 1A, the slope angles of light redirecting elements 170 decrease along the length of light redirecting member 160 from the proximal edge 165 to the distal edge 166.

As noted above, the slope angles of the light redirecting elements typically change in discrete increments to turn intermediate light 140 incident thereon through respective turning angles that vary in discrete increments. A light redirecting member in which the slope angles change in larger discrete increments is less expensive to manufacture than one in which the slope angles change in smaller discrete increments because the tool (not shown) used to make the light redirecting member is easier to make. A light redirecting member in which the slope angles of the light redirecting elements change in discrete increments of, for example, 5 degrees, can produce an illumination profile visually indistinguishable from that produced by a light redirecting member in which the slope angles of the light redirecting elements change in much smaller discrete increments.

Light redirecting elements 170 are at one major surface 162 or 163, both major surfaces 162, 163, or selected areas of one or both major surfaces of the light redirecting member 160. In addition, the light redirecting elements 170 may be designed to turn light by refraction, reflection or any combination thereof. Light redirecting elements that redirect light primarily through reflection and light redirecting elements that redirect light primarily through refraction may be mixed. The light redirecting elements may have different sizes and shapes and are designed to collectively produce the turning of the intermediate light 140 and the angular spread needed to provide output light 150 that illuminates the target surface 10 with the defined illumination profile. In the example shown, the light redirecting elements 170 turn light by total internal reflection.

Lighting assembly 100 is mounted with the plane of light guide 110 non-parallel to target surface 10. In typical applications, the lighting assembly is mounted with the plane of light guide 110 orthogonal or nearly orthogonal to the target surface. In other applications, the plane of light guide 110 is at an acute angle or an obtuse angle to the target surface. Moreover, in the application shown, the target surface 10 is planar. In other applications, the target surface is non-planar. The lighting assembly is mounted as follows:

near an edge of target surface 10, typically near the top edge 15 or the bottom edge 16 of the target surface. However, the lighting assembly may be rotated 90° about an axis parallel to major surface 112 and orthogonal to light input edge 114 and mounted at a side edge of the target surface;

at an offset from the target surface in the y-direction;

offset outwards from the edge of the target surface adjacent the lighting assembly, e.g., higher than the top edge 15 of the target surface; and with light input edge 114 remote from the target surface.

Figure 8:
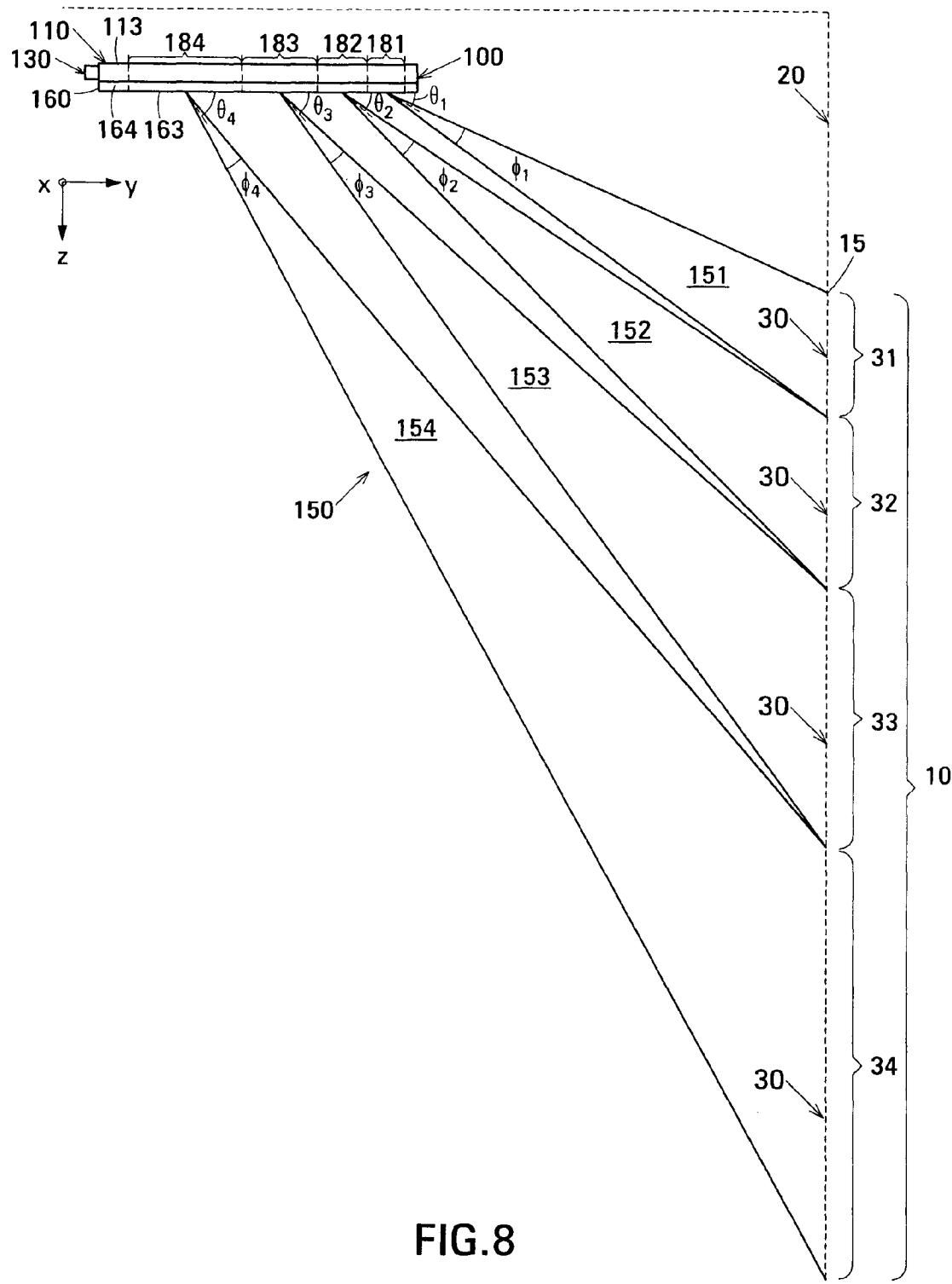
FIG. 8 is a side view showing an example of the lighting assembly shown in FIG. 1A configured to illuminate the target surface in accordance with a defined illumination profile.

FIG. 8 is a side view showing a highly simplified example of lighting assembly 100 configured to illuminate target surface 10 in accordance with a defined illumination profile. Target surface 10 can be regarded as being divided into a number of narrow spatial regions 30 that are elongate in the x-direction. Each spatial region is illuminated by lighting assembly 100 with a respective portion of output light 150 having a respective intensity that illuminates the spatial region with a respective illuminance defined by the illumination profile. In the example shown, target surface 10 is divided into only four regions 31, 32, 33 and 34 to simplify the drawing. In a practical example, the target surface is divided into a substantially greater number of regions.

Spatial regions 31-34 are shown arrayed in the z-direction in numerical order starting at an extremity of the target surface 10 closest in the z-direction to lighting assembly 100. For convenience of description, this extremity of the target surface is referred to herein as the top edge 15 of the target surface on the understanding that, in other applications, the extremity of the target surface closest to the lighting assembly can be at the bottom edge 16 or one of the side edges of the target surface.

Referring additionally to FIGS. 1A and 5, light redirecting member 160 has light redirecting elements 170 at one or both of its major surfaces 162, 163. Each light redirecting element 170 is configured to change the direction of propagation of the portion of the intermediate light 140 incident thereon through a defined turning angle to produce a respective portion of the output light that is output from the light redirecting member at a respective output angle.

In the example shown, light redirecting member 160 includes light redirecting zones 181, 182, 183 and 184 corresponding to regions 31, 32, 33, 34 of the target surface 10. The locations of light redirecting zones 181-184 are also shown in FIG. 8. Referring additionally to FIG. 5, light redirecting elements 171, 172, 173, 174 are located in light redirecting zones 181-184, respectively. Specifically, the light redirecting elements 171 within light redirecting zone 181 are configured to turn a portion of intermediate light 140 (FIG. 1A) incident thereon through a turning angle that directs the corresponding portion 151 of output light 150 at an output angle $\theta_1$ to the major surface 163 of light redirecting member 160. The output light portion 151 directed at the output angle $\theta_1$ is incident on region 31 of target surface 10. Region 31 is substantially larger in the z-direction than light redirecting zone 181 of light redirecting member 160 is in the y-direction. Moreover, region 31 and light redirecting zone 181 typically have similar dimensions in the x-direction. However, light redirecting elements 170 may additionally be configured to provide some redirection of intermediate light 140 in the x-direction. Additionally or alternatively, an additional light redirecting member may be provided in tandem with light redirecting member 160 to redirect the output light in the x-direction, as will be described below with reference to FIG. 19. In these cases, region 31 may be larger or smaller than light redirecting zone 181 in the x-direction, although the difference in size is typically small.

Similarly, the light redirecting elements 172, 173, 174 within light redirecting zones 182, 183, 184, respectively, of light redirecting member 160 are configured to turn respective portions of intermediate light 140 incident thereon through respective turning angles that direct corresponding portions 152, 153, 154 of output light 150 at output angles $\theta_2$, $\theta_3$, $\theta_4$, respectively, to the major surface 163 of light redirecting member 160.

The light redirecting elements 171, 172, 173, 174 within light redirecting zones 181, 182, 183, 184, respectively, are also configured to provide output light portions 151, 152, 153, 154 with respective angular spreads $\phi_1$, $\phi_2$, $\phi_3$, $\phi_4$ that correspond to the angles that regions 31, 32, 33, 34, respectively, subtend at lighting assembly 100. The term angular spread refers to a range of light ray angles within which the intensity of the light is greater than a threshold intensity. In an example, the threshold intensity is 50% of peak intensity. Output light portions 151, 152, 153, 154 directed at respective output angles $\theta_1$, $\theta_2$, $\theta_3$, $\theta_4$ and having respective angular spreads $\phi_1$, $\phi_2$, $\phi_3$, $\phi_4$ are incident on, and illuminate, regions 31, 32, 33, 34 of target surface 10 in accordance with a defined illumination profile. Consequently, the lighting assembly 100 illuminates the target surface 10. In the example shown in FIG. 8, regions 31-34 subtend equal angles at lighting assembly 100 and light redirecting elements 171, 172, 173, 174 within light redirecting zones 181, 182, 183, 184, respectively, are configured to provide equal angular spreads, i.e., $\phi_1=\phi_2=\phi_3=\phi_4$.

Referring additionally to FIGS. 1A and 5, light redirecting member 160 is an example of a light redirecting member that redirects low ray angle incident light, e.g., intermediate light 140, to generate output light having a defined light ray angle distribution, e.g., output light 150. Light redirecting member 160 includes a film substrate 164 and light redirecting zones 181-184 of light redirecting elements 170. Film substrate 164 has a light input surface 162, a light output surface 163 opposite light input surface 162, and a distal edge 166. Light redirecting zones 181-184 are at at least one of light input surface 162 and light output surface 163. The incident light is incident on light input surface 162 at low ray angles relative to the light input surface. The incident light has a direction of propagation having a vector component directed towards distal edge 166. Light redirecting elements 170 within each of the light redirecting zones 181-184 are collectively configured to redirect a respective portion of the incident light through a respective turning angle to produce a respective portion 151, 152, 153, 154 of output light 150 directed at a nominal output angle $\theta$ away from light output surface 163 and towards distal edge 166. The portion of the output light has a nominal angular spread $\phi$. The light ray angle distribution of output light 150 results from superposing the portions of the output light 150 produced by all of the light redirecting zones 181-184. Light redirecting zones 181-184 are relatively sized to weight the intensity, output angle $\theta$ and angular spread $\phi$ of the respective portions 151-154 of output light 150 in the light ray angle distribution of output light 150.

Figure 9:
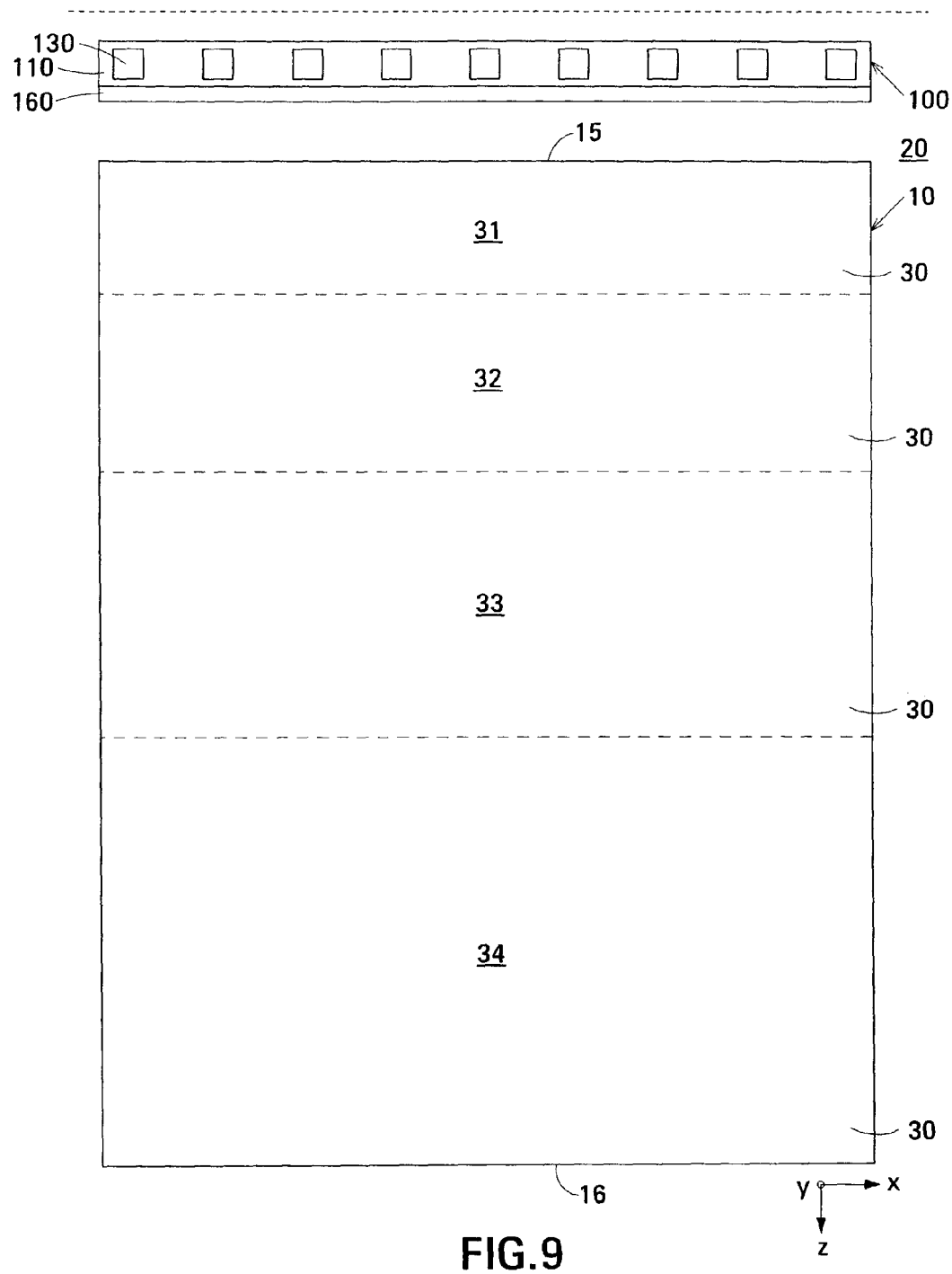
FIG. 9 is a front view schematically showing the target surface illuminated by an example of the lighting assembly shown in FIG. 8 configured to illuminate the illumination surface with a substantially-uniform illumination profile.

FIG. 9 is a front view showing target surface 10 illuminated by an example of lighting assembly 100 configured to illuminate the target surface in accordance with a substantially uniform illumination profile. A substantially-uniform illumination profile is an illumination profile in which the illuminance of the target surface 10 remains substantially constant over the target surface. In an example, a substantially-uniform illumination profile is one in which, in a contiguous region covering 80% of the target surface 10, the intensity varies by no more than ±20% from the mean intensity within the contiguous region. Other definitions of substantially-uniform illumination profile exist and may be used. In the example shown, target surface 10 is part of a larger surface 20. In the illumination profiles shown in FIGS. 9, 10, 11, 12 and 13A, white areas indicate regions of maximum intensity and shaded areas indicate regions of progressively lower intensity.

Referring additionally to FIGS. 5 and 8, in the example shown, consecutive ones of output angles $\theta_1$, $\theta_2$, $\theta_3$, $\theta_4$ differ by the same increment, and output light portions 151-154 have nominally the same angular spread $\phi_N$, where N=1, 2, 3, or 4 in this example. The size $z_N$ of each region 30 of target surface 10 in the z-direction (height) depends on the output angle $\theta_N$ and beam spread $\phi_N$ of the respective portion of output light 150 and the offset y in the y-direction of lighting assembly 100 from target surface 10 as follows.

$$z_N = y\left[\tan\left(\theta_N + \frac{\varphi_N}{2}\right) - \tan\left(\theta_N - \frac{\varphi_N}{2}\right)\right] \quad \text{(Eq. 1)}$$

Consequently, the regions 30 increase in height with increasing distance from the top edge 15 of target surface 10. The illuminance with which lighting assembly 100 illuminates each of the regions 30 depends on the intensity of the light emitted by the corresponding light redirecting zone 180 of the light redirecting member 160 divided by the area of the region. Accordingly, to illuminate target surface 10 with a substantially uniform illumination profile, an increasingly larger portion of the intermediate light 140 (FIG. 1A) extracted from light guide 110 is directed into each region 30 as the distance of the region from the top edge 15 of target surface 10 increases. The portion of intermediate light 140 redirected to a given region 30 in turn depends on the fraction of the area of light redirecting member 160 occupied by the light redirecting zone 180 of light redirecting elements 170 that redirect the portion of the intermediate light. By appropriately apportioning the area of light redirecting member 160 among light redirecting zones 181-184 of light redirecting elements 170 that redirect the intermediate light into respective regions 31-34 of the target surface, the illuminance within regions 31-34 can be set in accordance with the illumination profile notwithstanding the differing heights of the regions. The area of light redirecting member 160 that is apportioned among the light redirecting zones is the area of the major surface 162 and/or 163 on which intermediate light 140 is incident and that is occupied by light redirecting elements 170.

In an example in which intermediate light 140 has a uniform intensity profile and target surface 10 is illuminated with a substantially uniform illumination profile, as shown in FIG. 9, the area of light redirecting member 160 is apportioned among light redirecting zones 181-184 such that the fraction of the area of the light redirecting member occupied by each light redirecting zone 181-184 is proportional to the fraction of the area of the target surface 10 occupied by respective region 31-34. In an example in which region 31 occupies one-tenth of the area of target surface 10, light redirecting zone 181 occupies one-tenth of the area of the light redirecting member.

In another example in which intermediate light 140 has a uniform intensity profile and target surface 10 is illuminated with a defined, non-uniform illumination profile $I_N$, where $I_N$ is the illuminance in the N-th region from the top edge 15 of target surface 10, the area of light redirecting member 160 is apportioned among light redirecting zones 181-184 such that the fraction of the area of the light redirecting member occupied by each light redirecting zone 181-184 is proportional to the product of the fraction of the area of target surface 10 occupied by respective region 31-34 and the illuminance within the respective region 31-34 as defined by the intensity profile.

Figure 10:
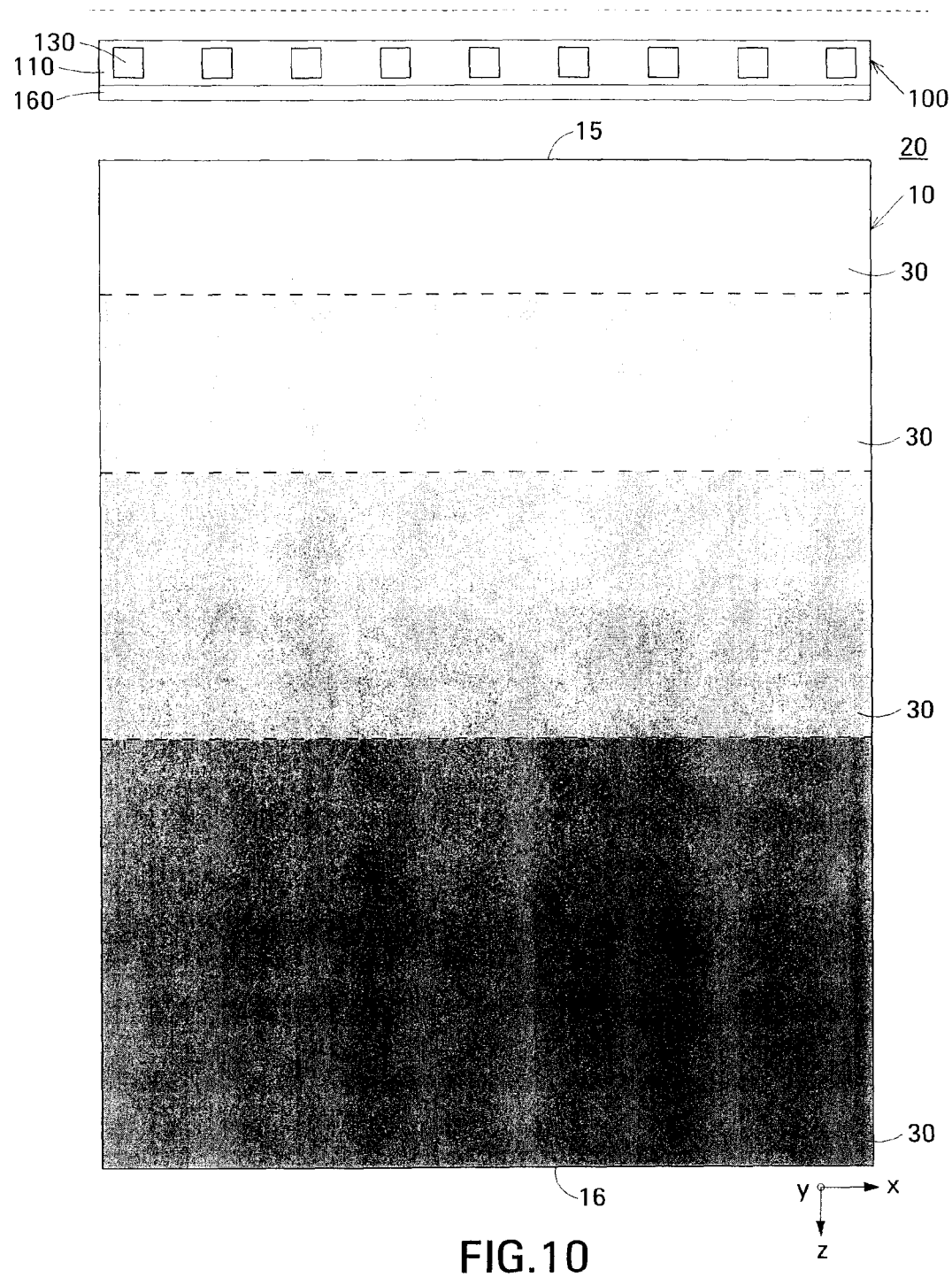
FIG. 10 is a front view schematically showing the target surface illuminated by an example of the lighting assembly configured to illuminate in accordance with an illumination profile in which the illuminance progressively decreases from the top to the bottom of the target surface.

FIG. 10 is a front view schematically showing target surface 10 illuminated in accordance with an example of an illumination profile in which the illuminance progressively decreases from the top edge 15 to the bottom edge 16 of the target surface. In the example shown, intermediate light 140 has a uniform illumination profile. To produce the illumination profile exemplified in FIG. 10, the light redirecting zones 180 that illuminate regions 30 near the top edge 15 of the target surface are larger in size, and the light redirecting zones 180 that illuminate regions near the bottom edge 16 of the target surface are smaller in size, than the corresponding light redirecting zones 180 that produce the uniform illumination profile shown in FIG. 9.

Figure 11:
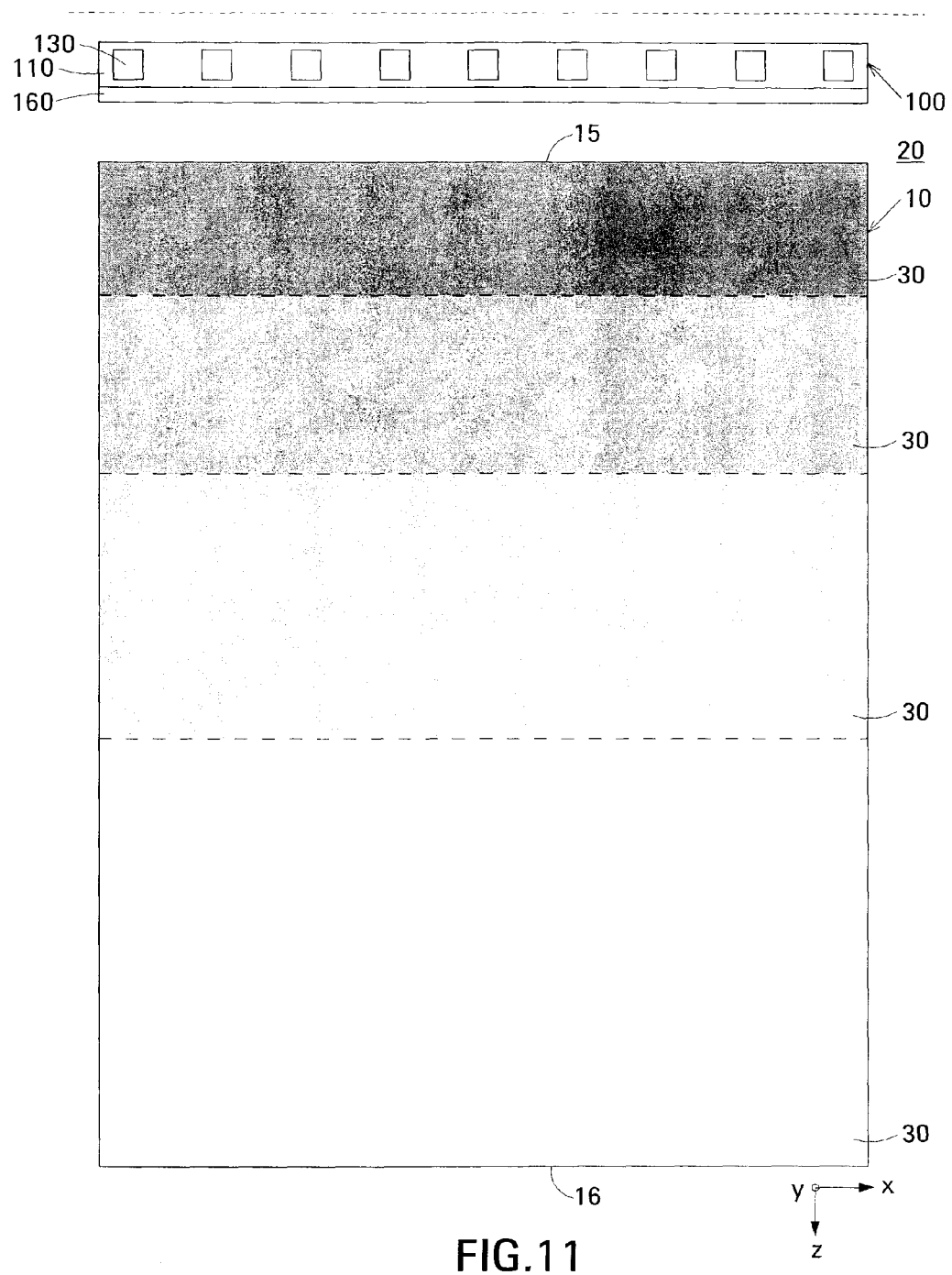
FIG. 11 is a front view schematically showing the target surface illuminated by an example of the lighting assembly configured to illuminate in accordance with an illumination profile in which the illuminance progressively increases from the top to the bottom of the target surface.

FIG. 11 is a front view schematically showing target surface 10 illuminated in accordance with an example of an illumination profile in which the illuminance progressively increases from the top edge 15 to the bottom edge 16 of the target surface. In the example shown, intermediate light 140 has a uniform illumination profile. To produce the illumination profile exemplified in FIG. 11, the light redirecting zones 180 that illuminate regions 30 near the top edge 15 of the target surface are smaller in size, and the light redirecting zones 180 that illuminate regions near the bottom edge 16 of the target surface are larger in size, than the corresponding light redirecting zones that produce the uniform illumination profile shown in FIG. 9.

Figure 12:
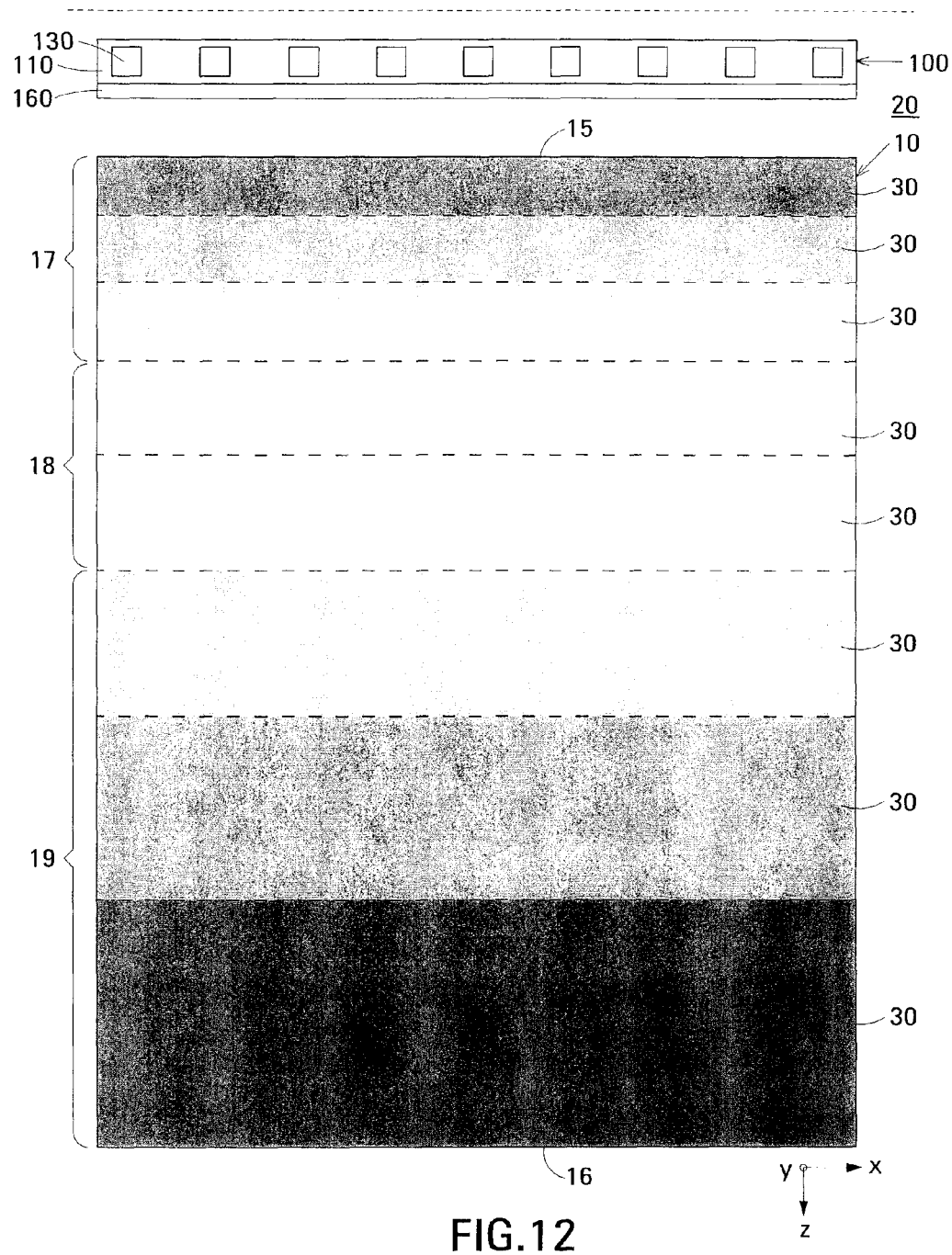
FIG. 12 is a front view schematically showing the target surface illuminated by an example of the lighting assembly configured to illuminate in accordance with an illumination profile in which the illuminance progressively increases from minimum illuminances near the top edge and the bottom edge of the target surface to a maximum illuminance in a region located part-way between the top edge and the bottom edge of the target surface.

FIG. 12 is a front view schematically showing target surface 10 illuminated with an example of an illumination profile in which the illuminance progressively increases from minimum illuminances near the top edge 15 and the bottom edge 16 of the target surface to a maximum illuminance in a portion located part-way between the top edge and the bottom edge of the target surface. Target surface 10 can be regarded as having a central portion 18 located part-way between the top edge 15 and the bottom edge 16 of the target surface, an upper portion 17 that extends from the top edge 15 of the target surface to the top of central portion 18 and a lower portion 19 that extends from the bottom of central portion 18 to the bottom edge 16 of the target surface. The illuminance increases progressively from the top edge 15 of the target surface to the top of central portion 18, remains substantially uniform in central portion 18, and decreases progressively from the bottom of central portion 18 to the bottom edge 16 of the target surface. In the example shown, intermediate light 140 (FIG. 1A) has a uniform illumination profile. To produce the illumination profile exemplified in FIG. 12, the light redirecting zones 180 that illuminate regions 30 in the upper portion 17 and the lower portion 19 of the target surface are smaller in size, and the light redirecting zones 180 that illuminate regions in the central portion 18 of the target surface are larger in size, than the corresponding light redirecting zones that produce the uniform illumination profile shown in FIG. 9.

In the examples described above with reference to FIGS. 9-12, the illumination profile is a one-dimensional illumination profile in which the illuminance varies only in the z-direction, and the light redirecting zones 180 of light redirecting member 160 remain constant in relative area in the x-direction. However, the illumination profile may be a two-dimensional illumination profile that defines the illuminance in each sub-region in a two-dimensional array of sub-regions obtained by dividing the above-described regions in the x-direction.

Figure 13A:
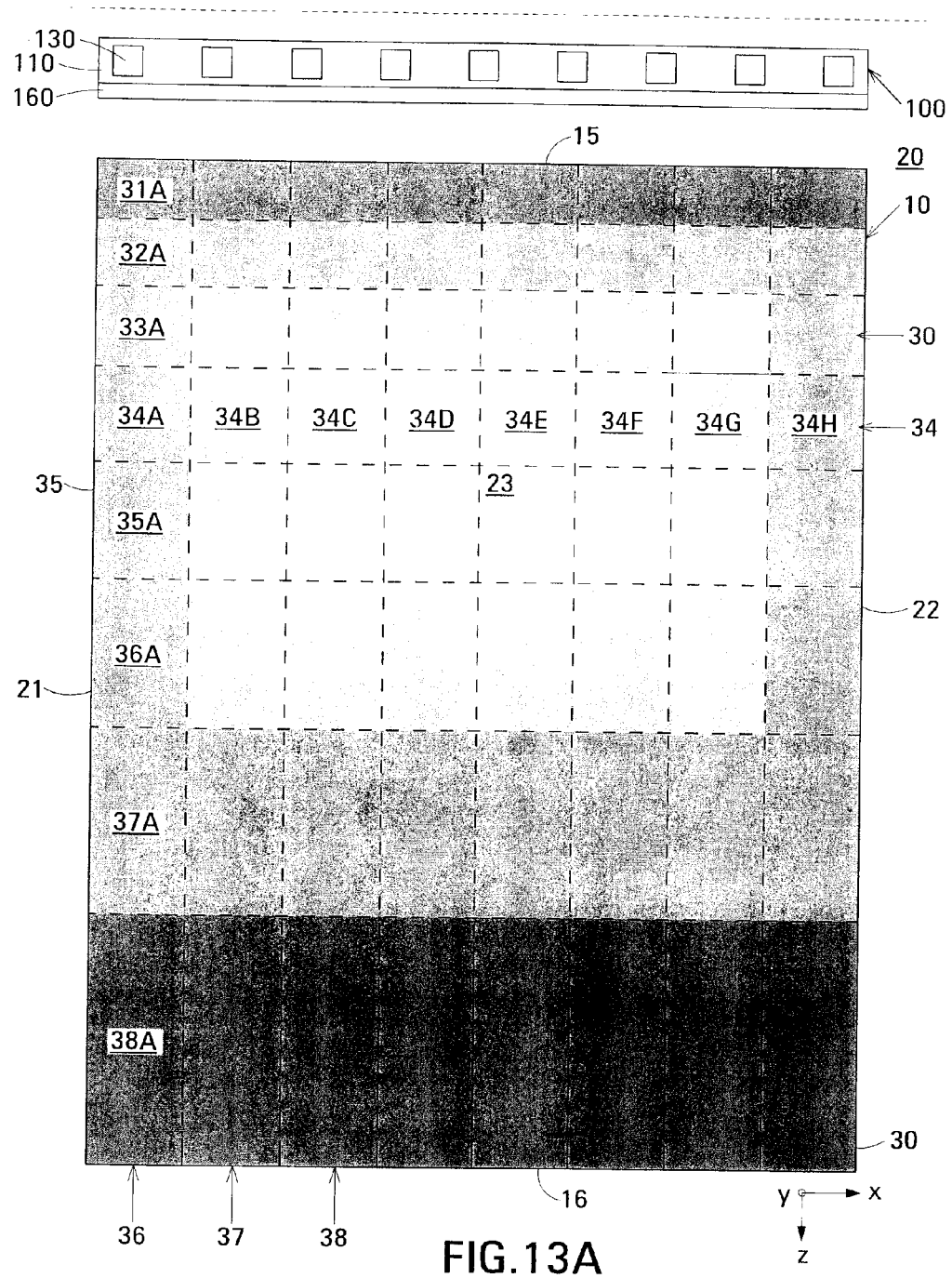
FIG. 13A is a front view schematically showing the target surface illuminated by an example of the lighting assembly configured to illuminate in accordance with a two-dimensional illumination profile having a maximum intensity in a "hot spot" located at a predefined location between the top edge and the bottom edge, and between the left edge and the right edge, of the target surface.

FIG. 13A is a front view schematically showing target surface 10 illuminated by an example of lighting assembly 100 configured to provide a two-dimensional illumination profile having a maximum intensity in a "hot spot" 23 located at a predefined location between the top edge 15 and the bottom edge 16, and between the left edge 21 and the right edge 22, of target surface 10. In the example shown, illuminance decreases radially outward from the "hot spot" to a lower illuminance that covers the remainder of the target surface. The illumination profile shown in FIG. 13A may be used, for example, to emphasize a piece of art or other object of interest mounted on the target surface.

In the example shown in FIG. 13A, each of the regions 30 (not all the regions are labeled to simplify the drawing) of the target surface 10 is divided into sub-regions arrayed in the x-direction. For example, region 34 is divided into sub-regions 34A through 34H arrayed in the x-direction. The number of sub-regions into which each region is divided depends on the spatial resolution of the illumination profile. An exemplary sub-region is shown at 35. Reference numeral 35 is also used to refer to the sub-regions collectively. Sub-regions 35 aligned with one another in the y-direction form a column, an exemplary one of which, composed of sub-regions 31A-38A, is shown at 36. Reference numeral 36 is also used to refer to the columns of sub-regions collectively.

The two-dimensional illumination profile of target surface 10 defines an illuminance $I_{X,Z}$ within each sub-region 35, where X and Z define the offset of the sub-region from the top, left-hand corner (or any other reference location) of target surface 10. Thus, the two-dimensional illumination profile can be regarded as a two dimensional array of rows and columns of illuminances corresponding to the rows and columns of the sub-regions. A one-dimensional portion of the two-dimensional illumination profile pertaining to each column 36 of sub-regions, e.g., column 36 composed of sub-regions 31A-38A, constitutes the illumination sub-profile for that column of the target surface. The column composed of sub-regions 31A-38A has an illumination sub-profile different from, for example, exemplary column 37.

Figure 13B:
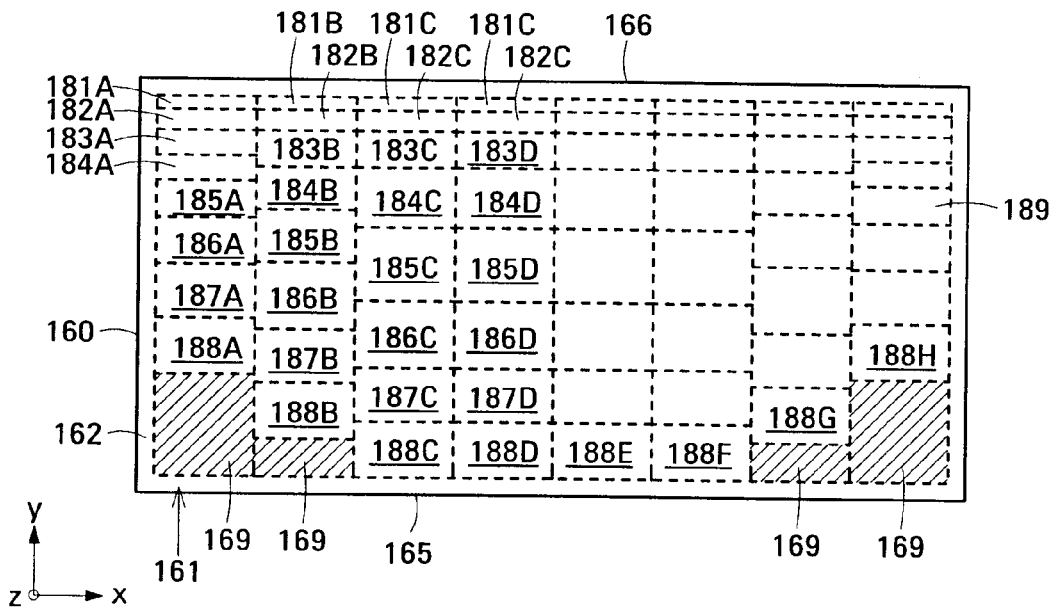
FIG. 13B is a plan view showing the major surface of a highly-simplified example of the light redirecting member of the lighting assembly shown in FIG. 1A configured to produce the two-dimensional illumination profile shown in FIG. 13A.

FIG. 13B is a plan view showing the major surface 162 of an example of the light redirecting member 160 configured to produce the two-dimensional illumination profile shown in FIG. 13A. The example is highly simplified to simplify the drawings and description. A typical light redirecting member has a substantially larger number of light redirecting zones and sub-zones, and target surface 10 has a correspondingly larger number of regions and sub-regions than is shown in FIG. 13A. Referring to FIGS. 1A, 13A and 13B, to illuminate the target surface with a two-dimensional illumination profile, such as that exemplified in FIG. 13A, the light redirecting elements of light redirecting member 160 are arranged in columns arrayed in the x-direction. An exemplary column is shown at 161. Reference numeral 161 is additionally used to refer to the columns collectively. The size of each column in the x-direction (width) corresponds to the width of a corresponding column of the sub-regions 35 of target surface 10.

Light redirecting elements 170 (FIG. 5) of light redirecting member 160 are configured to illuminate target surface 10 in accordance with a two-dimensional illumination profile by regarding each column 36 of target surface 10 as a narrow target surface similar to target surface 10. The column of sub-regions is illuminated by a portion intermediate light 140 (FIG. 1A) redirected by the light redirecting elements in the corresponding column 161 of light redirecting member 160 in accordance with a one-dimensional illumination profile defined by the corresponding column of the two-dimensional illumination profile. Within each column 36, each sub-region is illuminated by an output light portion redirected by the light redirecting elements 170 located in the corresponding column 161 of light redirecting member 160. As in the one-dimensional examples described above, light redirecting elements having similar light-redirecting properties are located in respective light redirecting sub-zones. An exemplary light redirecting sub-zone is indicated by reference numeral 189. Reference numeral 189 is also used to refer to the light redirecting sub-zones collectively. For example, the light redirecting elements located in exemplary column 161 are located in light redirecting sub-zones 181A through 188A. Light redirected by the light redirecting elements located in light redirecting sub-zones 181A through 188A illuminate sub-regions 31A through 38A of target surface 10. Light redirected by the light redirecting elements in the remaining columns of light redirecting subzones 189 (e.g., the column composed of light redirecting sub-zones 181B through 188B) illuminate respective columns (e.g., column 37) of the sub-regions 35 of target surface 10.

In the example shown, the light redirection sub-zones 189 of light redirecting elements having the same light redirecting properties appear in the same order in the columns of the array of sub-zones. For example, light redirecting sub-zones 188A-188H are all closest to proximal edge 165. In other examples, the light redirecting sub-zones of light redirecting elements having the same light redirecting properties appear in different orders in the columns of the array of sub-zones. In an example, only light redirecting sub-zone 188A is positioned closest to proximal edge 165, and light redirecting sub-zones 188B-188D are in positions respectively separated by 1, 2 and 3 other sub-zones from the proximal edge.

The area of light redirecting member 160 within each column 161 is apportioned among light redirecting sub-zones 189 in the column in a manner similar to that described above, i.e., in proportion to the one-dimensional illumination profile pertaining to the corresponding column of target surface 10, and at least one of the output angle and angular spread of the output light output by the light redirecting elements in each light redirecting sub-zone. For example, the area of light redirecting member 160 occupied by column 161 composed of light redirecting sub-zones 181A-188A that redirect portions of the intermediate light into the column 36 of target surface 10 composed of sub-regions 31A-38A is apportioned among light redirecting sub-zones 181A-188A in accordance with the one-dimensional illumination sub-profile $I_{1,Z}$, pertaining to column 36 of sub-regions in a manner similar to that described above for apportioning the area of the entire light redirecting member 160 among light redirecting zones 181-184 in accordance with the one-dimensional illumination profile $I_Z$.

In the example shown in FIGS. 13A and 13B, the total illuminance in columns 36 and 37 of target surface 10 is less than that in, for example, column 38. To provide this difference in illuminance, the total area of light redirecting member 160 occupied by light redirecting sub-zones 181A-188A and 181B-188B is less than that occupied by light redirecting sub-zones 181C-188C. Opaque regions 169 occupy the area of light redirecting member 160 not occupied by light redirecting sub-zones 181A-188A and by light redirecting sub-zones 181B-188B. In another example, light guide 110 is devoid of light extracting elements 120 in locations corresponding to the portions of light redirecting member 160 devoid of light redirecting sub-zones 189. With light guide 110 configured as just described, no intermediate light 140 (FIG. 1A) illuminates the portions of light redirecting member 160 devoid of light redirecting sub-zones 189. In this example, opaque regions 169 can be omitted as light redirecting member 160 is not illuminated where these regions are located. In another example, light redirecting sub-zones 181A-188A and 181B-188B are increased proportionately in size so that they collectively occupy all of the area of the light redirecting member in their respective columns. This reduces the illuminance contrast between column 38 and columns 36 and 37, but uses all of intermediate light 140 extracted from light guide 110 to illuminate target surface 10.

In yet another example, the light extracting elements 120 in columnar regions (not shown) of light guide 110 corresponding to the columns 161 of light redirecting member 160 that illuminate columns 36, 37 and 38 of target surface 10 are configured to extract respective portions of intermediate light 140 from the light guide with respective intensities corresponding to the respective total illuminances within columns 36, 37 and 38 of the target surface. No opaque regions 169 are needed in this example. In this example, light extracting elements 120 vary in one or more of size, shape, depth or height, density, orientation, slope angle, and index of refraction to extract light from light guide 110 with an intensity profile in which the intensity varies in the x-direction.

In yet another example, the light extracting elements 120 in a two-dimensional array of block-shaped regions (not shown)

of light guide 110 corresponding to the light redirecting sub-zones (e.g., light redirecting sub-zone 184A) of light redirecting member 160 that illuminate respective sub-regions (e.g., sub-region 34A) of target surface 10 are configured to extract respective portions of intermediate light 140 from the light guide with respective intensities corresponding to the respective illuminances in the corresponding sub-regions of the target surface. No opaque regions 169 are needed in this example. In this example, light extracting elements 120 vary in one or more of size, shape, depth or height, density, orientation, slope angle, and index of refraction to extract light from light guide 110 with an intensity profile in which the intensity varies in both the x-direction and the y-direction.

In the examples described above, the intermediate light 140 extracted from light guide 110 is described as having a uniform intensity profile. A uniform intensity profile can be obtained by increasing at least one of the size and the density of light extracting elements 170 with increasing distance in the y-direction from light input edge 114. In other examples, the intermediate light 140 extracted from light guide 110 has a non-uniform intensity profile. In a typical example, the light extracting elements are uniform in size and density so that the intensity of the intermediate light decreases with increasing distance from light input edge 114. In such examples, the area of the light redirecting member 160 is apportioned among the light redirecting zones 180 in proportion to not only the fraction of target surface 10 represented by the corresponding region and the relative illuminance of the region illuminated by output light from the light redirecting zone, as defined by the intensity profile, but also in inverse proportion to the intensity of the intermediate light 140 incident on the light redirecting zone.

In some embodiments, the size range of light redirecting zones 180, i.e., the size ratio between the smallest and the largest of the light redirecting zones, is reduced by locating the light redirecting zones on light redirecting member 160 in a way that takes account of the intensity profile of intermediate light 140 (FIG. 1A) incident thereon. In the example of the uniform illumination profile described above with reference to FIG. 9, the intermediate light is described as having a uniform intensity profile and the light redirecting zones 184-181 progressively decrease in size with increasing distance from proximal edge 165 adjacent light source 130. In another example (not shown) light guide 110 has light extracting elements 120 of uniform size and density that produce an intensity profile that decreases progressively from light input edge 114. In this example, light redirecting zones 184-181 are again arranged in order along the light redirecting member 160 with light redirecting zone 184 closest to the light input edge. The size of the light redirecting zone 184 is reduced compared with the example described above with reference to FIG. 9 to account for the greater intensity of the intermediate light incident thereon, and the size of the light redirecting zone 181 is increased compared with the example described above with reference to FIG. 9 to account for the smaller intensity of the intermediate light incident thereon, resulting in a smaller size range between light redirecting zones 181 and 184. The size and/or density of the light extracting elements 120 that extract the intermediate light 140 incident on each light redirecting zone 180 can be configured to vary the intensity of the intermediate light incident on each light redirecting zone 180 in accordance with the intensity requirements of the light redirecting zone to further reduce the size range of the light redirecting zones.

Figure 14:
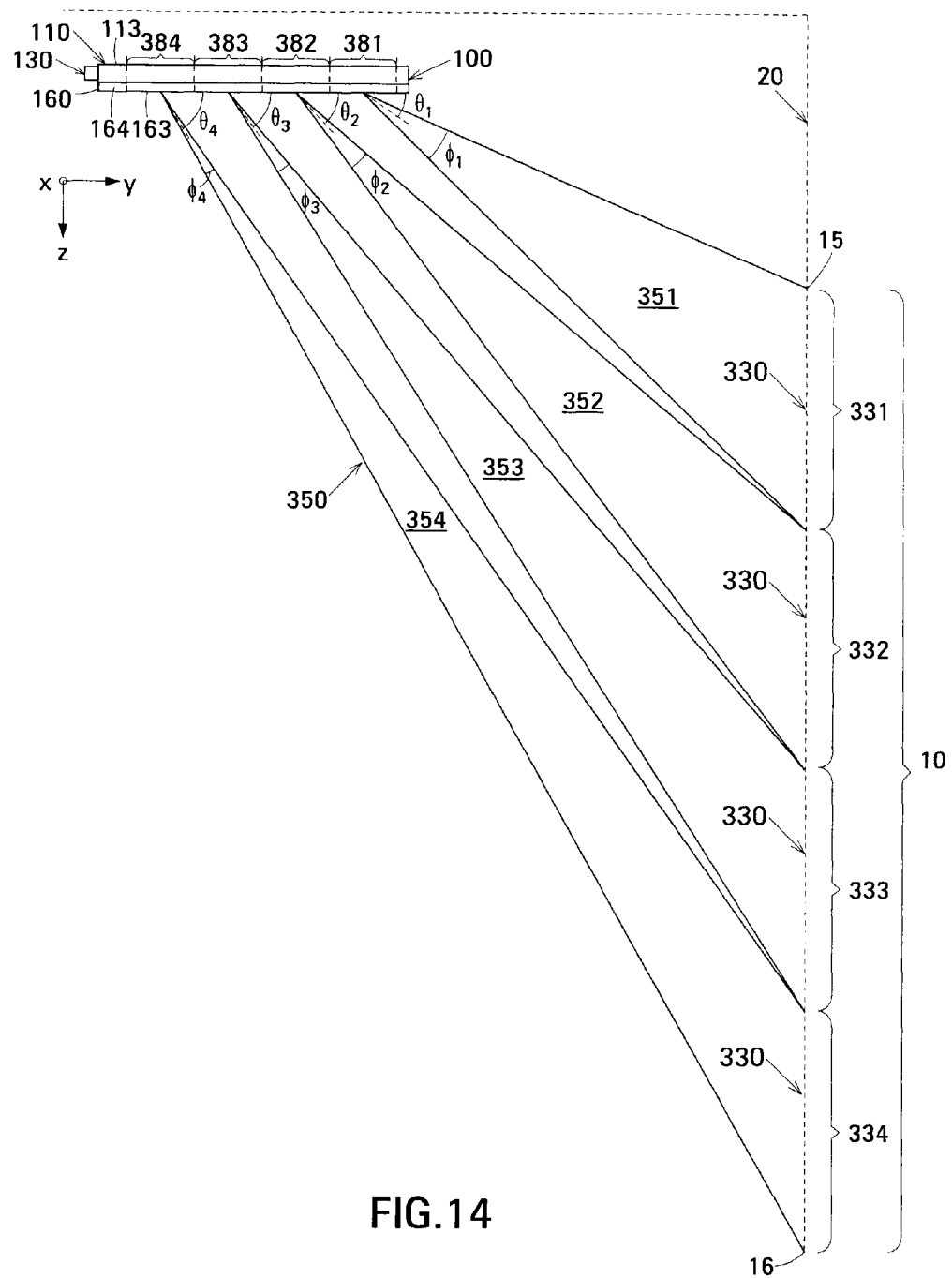
FIG. 14 is a side view showing another example of lighting assembly shown in FIG. 1A configured to illuminate the target surface divided into narrow spatial regions of nominally-equal size.

FIG. 14 is a side view showing another example of lighting assembly 100 configured to illuminate the target surface 10. In this example, the target surface is divided into a number of narrow spatial regions 330 of nominally-equal size. Regions 330 are elongate in the x-direction. In the example shown, target surface 10 is divided into only four spatial regions 331, 332, 333 and 334 to simplify the drawing. In a practical example, the target surface is divided into a substantially greater number of regions.

Similar to the example described above with reference to FIGS. 5 and 8, spatial regions 331-334 are arrayed in the z-direction in numerical order from top edge 15 to bottom edge 16 of target surface 10. In this example, spatial regions 331-334 are all equal in size. As a result, spatial regions 331-334 respectively subtend different angles at lighting assembly 100. Specifically, spatial regions 331-334 subtend progressively decreasing angles at the lighting assembly. Consequently, to illuminate each spatial region without excessive illumination of the regions adjacent the region, the light redirecting elements within the respective light redirecting zones are configured to provide output light portions having angular spreads $\phi_N$ that decrease as the nominal turning angle increases.

Moreover, since spatial regions 331-334 are all equal in size, the area of light redirecting member 160 is apportioned among light redirecting zones 381-384 only in accordance with the intensity of the intermediate light 140 (FIG. 1A) incident on each light redirecting zone and the illuminance, as defined by the illumination profile, of the corresponding region 331-334 of target surface 10 illuminated by the portion 351-354 of output light 350 output from the light redirecting zone. In the example shown, the intermediate light has a uniform illumination pattern and the illumination profile is a substantially uniform illumination profile, so that light redirecting zones 381-384 are equal in area. However, light redirecting zones 381-384 differ from one another in that the light redirecting elements of the light redirecting zones that illuminate regions closer to lighting assembly 100 (e.g., light redirecting zones 381, 382 that illuminate regions 331, 332) are configured to produce a wider angular spread than the light redirecting elements in the light redirecting zones that illuminate the region further from the lighting assembly (e.g., light redirecting zones 383, 384 that illuminate regions 333, 334). Specifically, the light redirecting elements configured to redirect the intermediate light through larger turning angles (corresponding to a larger output angle θ) are additionally configured to provide a narrower angular spread than the light redirecting elements configured to redirect the intermediate light through smaller turning angles.

While some of the angular spread of the output light portions is inherent due to the angular spread of intermediate light 140 and due to manufacturing tolerances, the angular spread of the output light portions redirected by the light redirecting zones in which the light redirecting elements configured to redirect the intermediate light through the smaller turning angles can be increased by populating such light redirecting zones with light redirecting elements having a number of different configurations. Each configuration provides a respective turning angle that differs from the nominal turning angle by a respective small amount within the range of turning angles that provides the desired angular spread. The relative numbers of the light redirecting elements of each configuration are chosen to provide an illuminance that has a maximum at the nominal turning angle, corresponding to the center or near the center of the region and that falls to a non-zero value (e.g., half the maximum intensity) at the edges of the region and falls further to a minimum value outside the region. This way, the output light portion illuminating each region overlaps the output light portions illuminating the adjacent regions to provide a smooth transition of illuminance between the regions.

Figure 15:
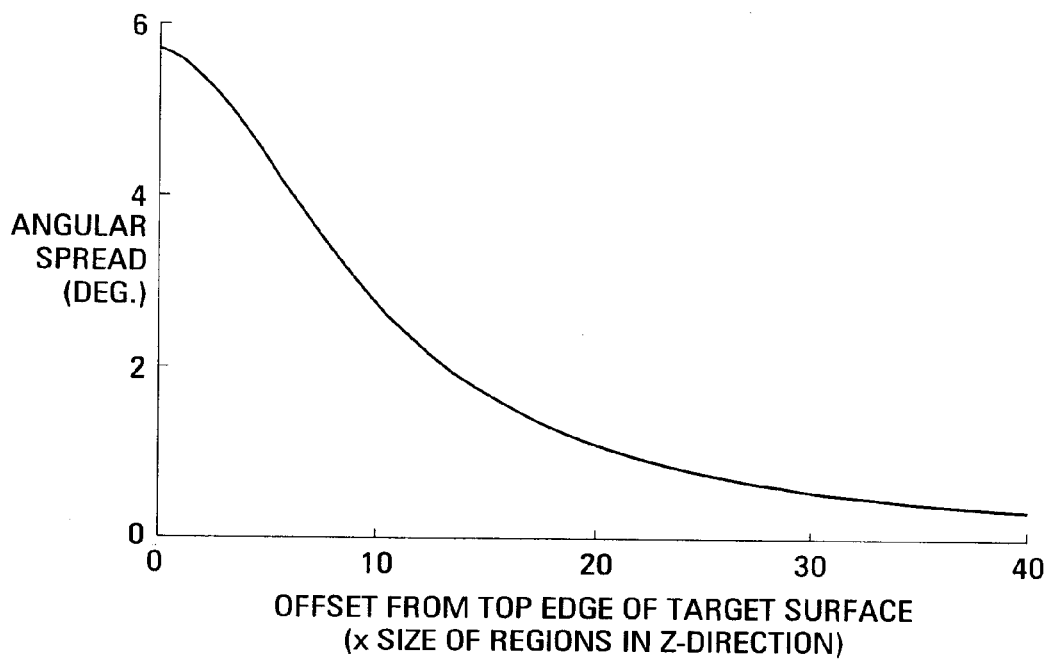
FIG. 15 is a graph showing the relationship between the angular spread of the output light illuminating each region of target surface and the offset of the region from the top edge of the target surface.

FIG. 15 is a graph showing the relationship between the angular spread of the portion of the output light illuminating each region of target surface 10 and the offset of the region from the top edge 15 of the target surface. The offset is quantified in multiples of the size of the region in the z-direction. In this example, target surface 10 is divided into 40 regions, the intensity profile is a uniform intensity profile and intermediate light 140 has a uniform intensity profile. In a similar example in which the illumination profile is a non-uniform intensity profile, the angular spreads remain the same, but the area of light redirecting member 160 is apportioned among the light redirecting zones in accordance with the illuminance in each region, as defined by the intensity profile. The example shown in FIG. 14 may be configured by configuring the sizes of the light redirecting zones to produce the exemplary illumination profiles described above with reference to FIGS. 9-13 as well as other illumination profiles not described above.

In other examples, the regions of target surface 10 differ in size in the z-direction, but by less than would make the portions of the output light have equal angular spreads. In such examples, the area of the light redirecting member is apportioned among the light redirecting zones in dependence on the illuminance in the corresponding regions, as defined by the illumination profile, the turning angle and the angular spread of the output light. Additionally, light redirecting elements having different configurations are provided within each light redirecting zone to define the angular spread of the output light.

In the examples described above, the light redirecting elements in each of the light redirecting zones 180 are located in a respective contiguous section of light redirecting member 160. In other examples, the light redirecting elements of each of the light redirecting zones 180 are distributed among multiple, non-contiguous sub-sections of the light redirecting member. Distributing the light redirecting zones among multiple, non-contiguous sub-sections of the light redirecting member helps homogenize the output light illuminating target surface 10 and reduces illumination profile artifacts resulting from the ordered structure of the light redirecting member.

Figure 16:
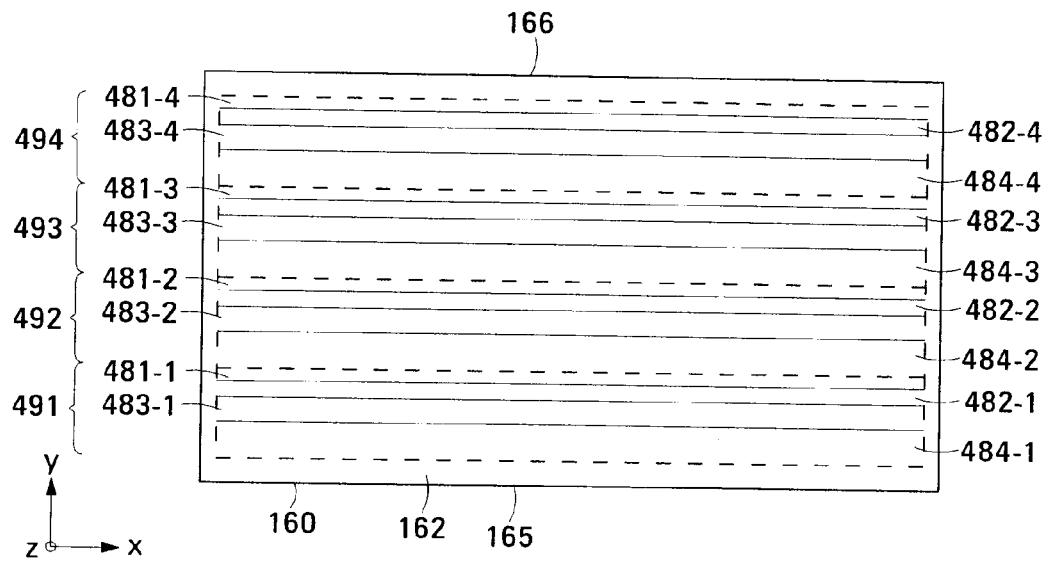
FIG. 16 is a plan view showing the major surface of another highly-simplified example of the light redirecting member in which the light redirecting elements are arranged in slices arrayed on the major surface in a direction orthogonal to the proximal edge.

FIG. 16 is a plan view showing the major surface 162 of another highly-simplified example of light redirecting member 160. To simplify the drawing, FIG. 16 shows the boundaries of the light redirecting zones but the individual light redirecting elements are not shown. In the example shown, the area of light redirecting member 160 is divided into four slices 491-494 arrayed in the y-direction between proximal edge 165 and distal edge 166. The slices extend all the way across the light redirecting member in the x-direction, and are of substantially equal size in the y-direction. In other examples, the number of slices is less than four, but is typically greater than, or much greater than, four.

Light redirecting member 160 includes light redirecting elements that redirect the intermediate light 140 (FIG. 1A) incident thereon to illuminate target surface 10 in accordance with a defined illumination profile, as described above. Light redirecting elements having the same nominal light redirecting characteristics are grouped into light redirecting zones similar to light redirecting zones 181-184 described above with reference to FIG. 5. In the example shown in FIG. 16, light redirecting zones 181-184 are divided into light redirecting sub-zones 481-1 through 481-4, 482-1 through 482-4, 483-1 through 483-4, and 484-1 through 484-4, respectively.

The light redirecting sub-zones into which each light redirecting zone is divided are typically equal in size. A respective one of the light redirecting sub-zones of each of the light redirecting zones is located in each of the slices. For example, light redirecting sub-zones 484-1, 482-1, 483-1 and 484-1 of light redirecting zones 181-184, respectively, are located in slice 491.

Dividing the area of light redirecting member 160 into slices 491-494 simplifies the process of configuring the light redirecting member. Each slice 491-494 can be regarded as a respective small light redirecting member similar to light redirecting member 160, but of a fraction of the size of light redirecting member 160 in the y-direction. The light redirecting elements within one of the slices, e.g., slice 491, are configured to redirect the intermediate light incident thereon in a manner that illuminates target surface 10 in accordance with the illumination profile, in a manner similar to that described above with reference to FIGS. 1A, 5 and 14. The light redirecting elements having the same nominal light redirecting properties are grouped into respective light redirecting sub-zones 481-1 through 484-1. Each light redirecting sub-zone is 1/M of the size of the corresponding light redirecting zone, where M is the number of slices. The area of light redirecting member 160 within slice 491 is apportioned among light redirecting sub-zones 481-1 through 484-1 in a manner similar to that described above. Once the light redirecting elements and light redirecting zones within slice 491 have been satisfactorily configured, the configuration of slice 491 is applied to the remaining slices of the light redirecting member, i.e., to slices 492-494 in this example. The light redirecting sub-zones within slices 492-494 are indicated by reference numerals 481-2 through 484-2; 481-3 through 484-3; and 481-4 through 484-4, respectively.

With light redirecting member 160 configured as just described, output light portions respectively redirected by the light redirecting sub-zones within each slice 491-494 collectively illuminate the entire target surface 10. For example, output light portions respectively redirected by light redirecting sub-zones 481-1 through 484-1 in slice 491 collectively illuminate the entire target surface 10. Moreover, each region of illuminated surface 10 is illuminated by respective output light portions redirected by a respective light redirecting sub-zone in each of the slices 491-494. For example, region 31 of illuminated surface 10 is illuminated by respective output light portions redirected by light redirecting sub-zone 481-1 in slice 491, light redirecting sub-zone 481-2 in slice 492, light redirecting sub-zone 481-3 in slice 493, and light redirecting sub-zone 481-4 in slice 494.

Configuring the light redirecting elements within a single narrow slice 491 of light redirecting member 160, apportioning the area of the light redirecting member within slice 491 among light redirecting sub-zones 481-1 through 484-1, and replicating the configuration of slice 491 in the remaining slices 492-494 of the light redirecting member simplifies the processes of designing the light redirecting member and making the tools used to mass manufacture light redirecting members. Moreover, distributing the light redirecting zones among narrow slices 491-494 arrayed along light redirecting member in the y-direction can further simplify the design of the light redirecting member in that it can eliminate the need to compensate for y-direction variations of the intensity profile of intermediate light 140 (FIG. 1A). The small size of the slices in the y-direction allows the intermediate light incident on each slice to be regarded as having a uniform intensity profile notwithstanding the intermediate light having an intensity profile that has an overall variation between the proximal edge 165 and the distal edge 166 of the light redirecting member.

In the example shown in FIG. 16, the positions of the light redirecting sub-zones within the slices 491-494 are the same in all the slices, i.e., light redirecting sub-zones 484-1 through 484-4 are closest to proximal edge 165 in all the slices. In another example, the positions of the light redirecting sub-zones within slices 491-494 differ among the slices to further homogenize the output light. In an example, light redirecting sub-zones 481-1, 482-2, 483-3 and 484-4 are closest to proximal edge 165 in slices 491-494, respectively, and the positions of the remaining light redirecting zones are sequentially or randomly rearranged within the slices. The position of a given light redirecting sub-zone within a slice can be regarded as the number (0 through 3 in the highly-simplified example shown) of other light redirecting sub-zones between the light redirecting sub-zone and the edge of the respective slice 491-494 closest to proximal edge 165. For example, light redirecting sub-zone 483-1 is in position 1 in slice 491. A similar definition of position can be applied to position within the blocks described below with reference to FIG. 17.

Figure 17:
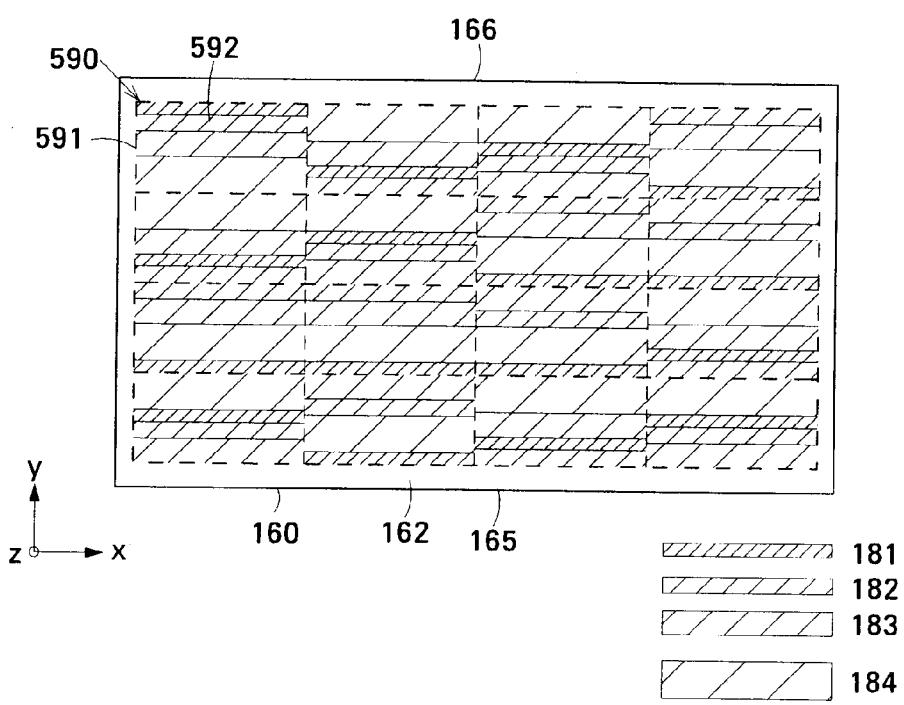
FIG. 17 is a plan view showing the major surface of another highly-simplified example of the light redirecting member in which the light redirecting elements are arranged in blocks arrayed on the major surface in a two-dimensional array.

FIG. 17 is a plan view showing the major surface 162 of yet another highly-simplified example of light redirecting member 160. To simplify the drawing, FIG. 17 shows the boundaries of the light redirecting sub-zones but the individual light redirecting elements are not shown. In the example shown, in the area of light redirecting member 160 is divided into a two-dimensional array 590 of blocks. Rows of the array extend in the x-direction and columns of the array extend in the y-direction. An exemplary block is indicated by reference numeral 591. In applications in which the illumination profile is a one-dimensional illumination profile, the size of the blocks in the x-direction may be larger than in the y-direction. In applications in which the illumination profile is a two-dimensional illumination profile, the x-direction and y-direction sizes are typically comparable, or equal. In the example shown, the array has four blocks in each direction. In other examples, the number of blocks in each direction is less than four, but is typically greater than, or much greater than, four.

Light redirecting member 160 includes light redirecting elements that redirect the intermediate light 140 (FIG. 1A) incident thereon to illuminate target surface 10 in accordance with a defined illumination profile, as described above. Light redirecting elements having the same nominal light redirecting characteristics are grouped into light redirecting zones similar to light redirecting zones 181-184 described above with reference to FIG. 5. Each of the light redirecting zones is divided into light redirecting sub-zones. An exemplary light redirecting sub-zone is indicated by reference numeral 592. Reference numeral 592 will additionally be used to refer to the light redirecting sub-zones collectively. The number of light redirecting sub-zones 592 into which each light redirecting zone is divided is equal to the number of blocks into which the area of light redirecting zone is divided. A respective one of the light redirecting sub-zones 592 into which each light redirecting zone is divided is located in each of the blocks 591. Consequently, one light redirecting sub-zone corresponding to each light redirecting zone is located within each block 591.

In the example shown in FIG. 17, the output light is homogenized by randomizing the positions (defined above) of the light redirecting sub-zones 592 within the blocks 591 located in each column of blocks so that light redirecting sub-zones corresponding to a given light redirecting zone are located in different positions in adjacent blocks in each row. The light redirecting sub-zones 592 corresponding to each of the light redirecting zones 181-184 in each of the blocks 590 are indicated by respective hatching labeled with the reference numeral of the light redirecting zone.

Figure 18:
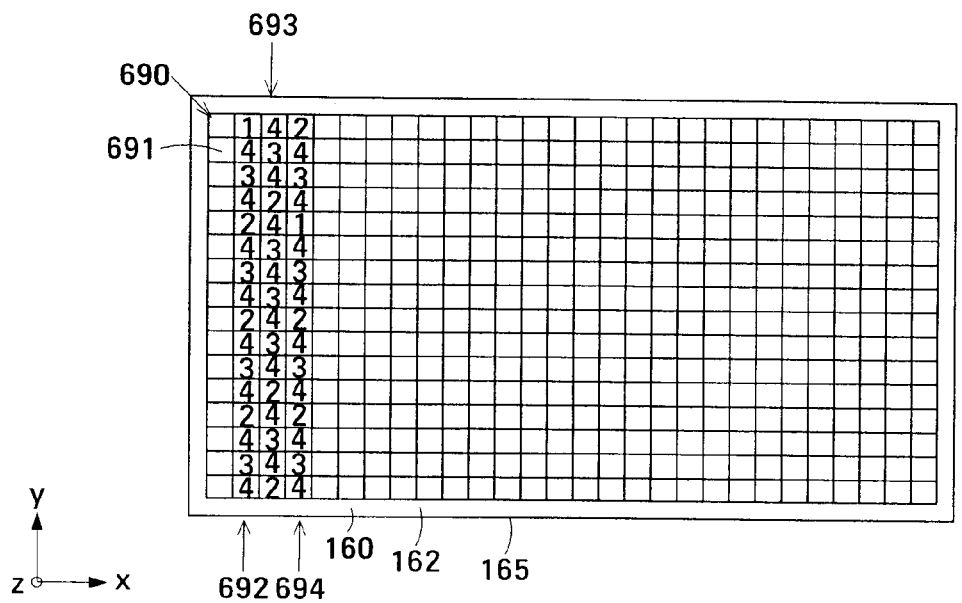
FIG. 18 is a plan view showing the major surface of another highly-simplified example of the light redirecting member in which light redirecting elements having the same light redirecting properties are located in one or more zone fragments and the zone-fragments are arranged in a two-dimensional array on the major surface.

FIG. 18 is a plan view showing the major surface 162 of yet another highly-simplified example of light redirecting member 160. In the example shown, the area of light redirecting member 160 is divided into a two-dimensional array 690 of light redirecting zone fragments (zone fragments). Rows and columns of the array extend in the x-direction and the y-direction, respectively. An exemplary zone fragment is indicated by reference numeral 691. Reference numeral 691 is also used to refer to the zone fragments collectively. To simplify the drawing, FIG. 18 shows the boundaries of the zone fragments but the light redirecting elements within the zone fragments are not shown.

In the example shown, the zone fragments are substantially square in shape. This example is suitable for use in applications in which the illumination profile is a two-dimensional illumination profile, although it can also be used with a one-dimensional illumination profile. In applications in which the illumination profile is a one-dimensional illumination profile, the zone fragments are typically rectangular, with the x-direction dimension larger than the y-direction dimension. In the example shown, 16 zone fragments are arrayed in the y-direction. In other examples, the number of zone fragments arrayed in the y-direction is less than 16, but is typically greater than, or much greater than, 16.

Light redirecting member 160 includes light redirecting elements (not individually shown) that redirect the intermediate light 140 (FIG. 1A) incident thereon to illuminate target surface 10 in accordance with a defined illumination profile, as described above. Light redirecting elements having the same nominal light redirecting properties are grouped into light redirecting zones similar to light redirecting zones 181-184 described above with reference to FIG. 5. The area of light redirecting member 160 is apportioned among the light redirecting zones also as described above. In this embodiment, the light redirecting elements of each light redirecting zone are assigned to one or more of the zone fragments 691. Consequently, the light redirecting elements assigned to a given zone fragment all have the same nominal light redirecting properties, e.g., turning angle and angular spread. The zone fragments populated with the light redirecting elements of a given light redirecting zone are of a zone fragment type corresponding to the light redirecting zone. Zone fragment type describes the light redirecting properties of the zone fragment. The light redirecting elements in the zone fragment in a given column or group of adjacent columns in array 690 redirect the portion of the intermediate light incident thereon to illuminate a corresponding column of target surface 10 in accordance with a corresponding portion of the illumination profile pertaining to the column of the target surface.

Typically, the number of light redirecting elements in each zone fragment ranges from several tens to as few as a single light redirecting element.

The area of light redirecting member 160 is apportioned among the zone fragments of the different zone fragment types proportionally to the apportionment of the area of the light redirecting member among the corresponding light redirecting zones. However, in many cases, a quantization effect resulting from the non-infinitesimal size of the zone fragments prevents the area apportionment among the zone fragments from exactly matching the area apportionment among the light redirecting zones. Thus, the area apportionment among the zone fragments is an approximation of the area apportionment among the light redirecting zones. The closeness of the area approximation depends on the size of the zone fragments. Moreover, because the light redirecting elements redirect light principally in the y-direction, the area apportionment is performed on a per-column basis, or at most over a few adjacent columns. The area of light redirecting member 160 within each column is apportioned among the zone fragments of the different zone fragment types proportionally to the apportionment of the area of the light redirecting member within the column among the corresponding light redirecting zones. The per-column apportionment makes the quantization effects more severe, but the quantizing effects can be mitigated by averaging over a number of adjacent columns, as will be described in detail below.

The example of light redirecting member 160 shown in FIG. 18 is configured by configuring the light redirecting elements to redirect the intermediate light incident thereon in a manner that illuminates target surface 10 in accordance with the illumination profile, as described above with reference to FIGS. 1A, 5 and 8. Light redirecting elements having the same nominal light redirecting properties are then grouped into light redirecting zones, as described above, and the area of the light redirecting member is apportioned among the light redirecting zones, also as described above. This defines the size of the area of light redirecting member apportioned to each light redirecting zone. In an example in which the target surface is illuminated in accordance with the illumination profile using four types of light redirecting elements, as in the examples described above, the area of light redirecting member 160 is apportioned among light redirecting zones 181, 182, 183 and 184. Then, in each column of the array of zone fragments 691, one or more zone fragments of a type having the same light redirecting properties as the light redirecting elements within each light redirecting zone (e.g., 181-184) are assigned to the light redirecting zone in proportion to the relative size of the light redirecting zone. The number of zone fragments assigned to each light redirecting zone is subject to the quantization that results from the zone fragments having a non-infinitesimal size.

In an example, similar to the ones described above, target surface 10 is illuminated in accordance with a desired illumination profile using light redirecting elements having four discrete light redirecting properties, and each column of zone fragments has 16 zone fragments so that each zone fragment accounts for 6.25% of the area of the column of array 690 in which it is located. The light redirecting elements are grouped into respective light redirecting zones similar to light redirecting zones 181-184. The area of light redirecting member 160 is apportioned among light redirecting zones 181-184 such that light redirecting zones 181-184 occupy 9%, 16%, 26% and 49%, respectively, of the area, for example. Expressed as sixteenths, these percentages become 1.4, 2.6, 4.1 and 7.9. None of these is a whole number. The relative sizes of the light redirecting zones quantize to the 16-step scale defined by the 16 zone fragments in each column in this example as 1, 3, 4 and 8. Thus, in the example shown in FIG. 18, an exemplary column 692 of array 690 contains one zone fragment of a first zone fragment type (labeled 1), three zone fragments of a second zone fragment type (labeled 2), four zone fragments of a third zone fragment type (labeled 3) and eight zone fragments of a fourth zone fragment type (labeled 4), where zone fragments of the first through fourth zone fragment types have light redirecting properties corresponding to those of light redirecting zones 181-184, respectively.

To homogenize the output light, the zone fragments of the different zone fragment types are interspersed in each column. In the example shown, in column 692, no two zone fragments 691 of the same zone fragment type are next to one another. To further homogenize the output light, the positions of the zone fragments of the different zone fragment types differ among the columns, as exemplified in columns 692 and 693. Zone fragment types are not shown in the remaining columns to simplify the drawing.

To reduce the above-mentioned quantizing effects resulting from the non-infinitesimal size of zone fragments 690, the number of zone fragments of a given type in adjacent columns is varied to provide a number of zone fragments of that type that, when averaged over the adjacent columns, more closely approximates the area apportionment of the light redirecting zones. In cases in which the area of the light redirecting zone is small, averaging may result in some columns being devoid of zone fragments of the zone fragment type corresponding to such light redirecting zone. For example, columns 692 and 694 each have one zone fragment of the first zone fragment type whereas column 693 has none. The number of zone fragments of the first zone fragment type averages 1.5 over columns 692-694. This more closely matches the exemplary area apportionment to light redirecting zone 181 (9%=1.4 sixteenths) than would be obtained with all three columns having one zone fragment of the first zone fragment type.

In applications in which the illumination profile is a two-dimensional illumination profile, the number of zone fragments of each zone fragment type in each column varies across the columns to vary the illumination profile in the x-direction. One or more zone fragments in one or more columns may be covered with opaque material to reduce the overall illuminance in such columns in a manner similar to that described above with reference to FIGS. 13A and 13B.

The above-described lighting assemblies generate output light having a defined light ray angle distribution. The defined light ray angle distribution is one that, when incident on a target surface, illuminates the target surface in accordance with a defined illumination profile. The lighting assembly includes a light source, a light guide edge lit by the light source, and a light redirecting member. The light guide has a light input edge and a light output surface, and comprises light extracting elements to extract light from the light guide through the light output surface as intermediate light. The intermediate light is directed away from the light input edge and the light output surface and has a maximum intensity at a low ray angle relative to the light output surface.

The light redirecting member is positioned to receive the intermediate light and has opposed major surfaces. The light redirecting member includes light redirecting zones that include light redirecting elements. The light redirecting elements within each of the light redirecting zones are configured to redirect a respective portion of the intermediate light incident thereon through a respective turning angle to produce a respective portion of output light. The portion of the output light has a nominal angular spread and is directed at a nominal output angle away from the light input edge and the light output surface. The light ray angle distribution of the output light results from superposing the portions of the output light produced by all of the light redirecting zones. The light redirecting zones are relatively sized to weight the intensity, output angle and angular spread of the respective portions of the output light in the light ray angle distribution of the output light.

In some embodiments, interchangeable light redirecting members 160 are provided, each designed to provide a specific illumination profile from intermediate light 140 extracted from the same or similar type light guide 110. In some examples, the illumination profile is tailored to a location in a room (e.g., near a wall, corner or center), or tailored to provide a desired light distribution profile on a wall or other target surface.

In some embodiments, lighting assembly 100 is designed such that light redirecting member 160 can easily be changed during installation of the lighting assembly to obtain a desired lighting effect based on the location of the lighting assembly relative to the target surface.

Figure 19:
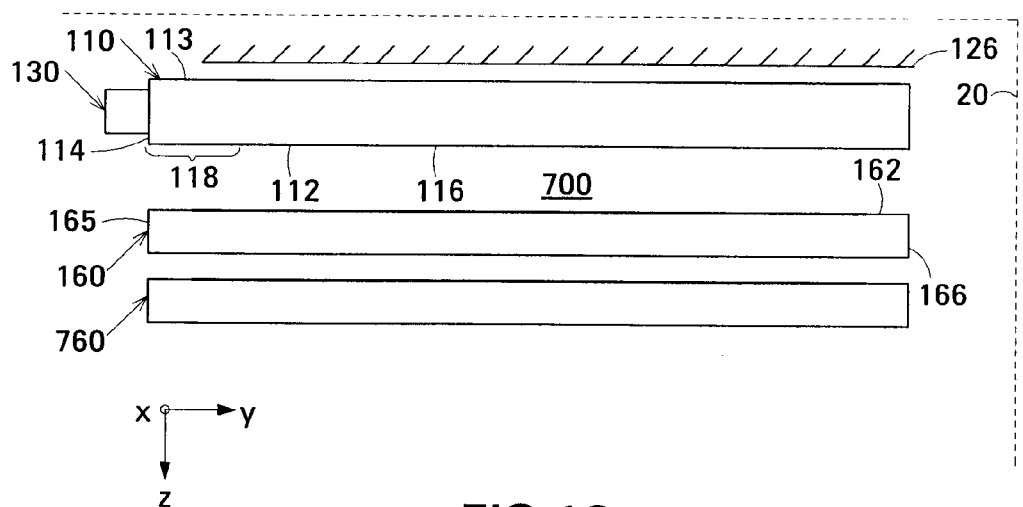
FIG. 19 is an exploded view schematically showing an example of another embodiment of a lighting assembly.

FIG. 19 is an exploded view schematically showing an example of another embodiment 700 of a lighting assembly. Elements of lighting assembly 700 that correspond to elements of lighting assembly 100 described above with reference to FIGS. 1A, 1B and 5 are indicated using the same reference numerals and will not be described again here. Lighting assembly 700 has at least one additional light redirecting member to improve system performance and output distribution. In the example shown in FIG. 19, an additional light redirecting member 760 is located in tandem with light redirecting member 160. Light redirecting members 160 and 760 are in tandem in the sense that light passes through one light redirecting member after it has passed through at least part of the other light redirecting member. In the example shown, light redirecting member 160 is located between light redirecting member 760 and light guide 110. In another example, light redirecting member 760 is located between light redirecting member 160 and light guide 110. Each light redirecting member may have a different pattern of light redirecting elements for performing different functions. In one example, one of the light redirecting members redirects intermediate light 140 (FIG. 1A) extracted from light guide 110 so that the intermediate light can be more efficiently redirected by the other light redirecting member. In another example, one of the light redirecting members redirects part of intermediate light 140 to produce one portion of a desired illumination profile, and the other light redirecting member redirects another part of the intermediate light to produce another portion of a desired illumination profile. In another example, one light redirecting member redirects the intermediate light in a first direction and the other light redirecting member redirects the light redirected by the one light redirecting member in a second direction, different from the first direction. In an example, light redirecting member 160 redirects light in the y-direction, as described above, and light redirecting member 760 redirects light in the x-direction, orthogonal to the y-direction, to enable lighting assembly 700 to illuminate a target surface larger in the x-direction than the lighting assembly.

Lighting assembly 700 additionally includes an optional reflector 126 placed near the major surface 113 of light guide 110 to reflect any light that leaves the light guide through major surface 113 back towards the opposite major surface 112, whence the light is emitted from the light guide as part of intermediate light 140.

In other examples, the lighting assembly contains sensors and feedback circuitry for color and/or intensity control. Other types of sensors such as motion detectors may also be integrated into the lighting assembly. In addition, the lighting assembly may reside on a network such that it can be controlled from another location. Further, a target area on the wall may contain reflective signage or display, and the illumination profile of the lighting assembly may be optimized to increase readability of the signage or display.

The light guides disclosed herein, such as light guide 110 shown in FIG. 1A, having light extracting elements 120 at one or more of its major surfaces are typically formed by a process such as molding or extruding, or by subjecting a substrate to a process such as stamping, embossing, laser etching, chemical etching, or another suitable process. Light extracting elements 120 may also be produced by depositing elements of curable material on one or both major surfaces of light guide 110 and curing the deposited material using heat, UV-light or other radiation. The curable material can be deposited by a process such as printing, ink jet printing, screen printing, or another suitable process. Alternatively, light extracting elements 120 may be inside light guide 110 between major surfaces 112, 113 (e.g., the light extracting elements may be light redirecting particles and/or voids disposed in the light guide).

Exemplary light extracting elements 120 include light-scattering elements, which are typically features of indistinct shape or surface texture, such as printed features, ink jet printed features, selectively-deposited features, chemically etched features, laser etched features, and so forth. Other exemplary light extracting elements include features of well-defined shape, such as V-grooves, lenticular grooves, and features of well-defined shape that are small relative to the linear dimensions of the major surfaces 112, 113, which are sometimes referred to as micro-optical elements, which are described above.

The light redirecting members disclosed herein, such as light redirecting member 160 shown in FIG. 1A and light redirecting member 760 shown in FIG. 19, having light redirecting elements at one or more of its major surfaces is typically embodied as a film, and light redirecting elements 170 are typically formed by a process such as stamping, molding, embossing, extruding, or another suitable process. Light redirecting elements 170 may also be produced by depositing elements of curable material on one or both major surfaces of the light redirecting member, applying a mold to define the light redirecting elements and curing the deposited material using heat, UV-light or other radiation. Alternatively, a layer having light redirecting elements 170 is encapsulated by another layer of a material with a different refractive index to form light redirecting member 160 with the light redirecting elements located between major surfaces 162, 163.

In this disclosure, the phrase "one of" followed by a list is intended to mean the elements of the list in the alternative. For example, "one of A, B and C" means A or B or C. The phrase "at least one of" followed by a list is intended to mean one or more of the elements of the list in the alternative. For example, "at least one of A, B and C" means A or B or C or (A and B) or (A and C) or (B and C) or (A and B and C).

We claim:

1. A lighting assembly to illuminate a target surface with a defined illumination profile, the lighting assembly comprising:

a light source;

a light guide edge lit by the light source, the light guide having a light input edge and a light output surface, and comprising light extracting elements to extract light from the light guide through the light output surface as intermediate light, the intermediate light directed away from the light input edge and the light output surface and having a maximum intensity at low ray angles relative to the light output surface;

a light redirecting member positioned to receive the intermediate light, the light redirecting member having opposed major surfaces and comprising light redirecting zones comprising light redirecting elements at at least one of the major surfaces, in which:

the light redirecting elements within each light redirecting zone are collectively configured to redirect a respective portion of the intermediate light incident thereon through a respective turning angle to produce a respective portion of output light having a defined angular spread and directed at a nominal output angle away from the light input edge and the light output surface of the light guide and towards a respective spatial region of the target surface such that the illumination profile on the target surface is the result of superposing the portions of the output light from all the light redirecting zones; and the portion of the intermediate light directed into each spatial region by the respective light redirecting zone depends on the illuminance within the region, as defined by the illumination profile, and at least one of the output angle and the angular spread of the respective portion of the output light.

2. The lighting assembly claim 1, in which:

each of the light redirecting member and the target surface has a respective area;

each region occupies a respective fraction of the area of the target surface; and the area of the light redirecting member is apportioned among the light redirecting zones such that each light redirecting zone occupies a fraction of the area of the light redirecting member in proportion to the fraction of the area of the target surface occupied by the region illuminated by the portion of the output light produced by the light redirecting zone.

3. The lighting assembly claim 1, in which:

each of the light redirecting member and the target surface has a respective area;

each region occupies a respective fraction of the area of the target surface; and the area of the light redirecting member is apportioned among the light redirecting zones such that each light redirecting zone occupies a fraction of the area of the light redirecting member in proportion to a product of (a) the fraction of the area of the target surface occupied by the region illuminated by the portion of the output light produced by the light redirecting zone and (b) the illuminance within the region, as defined by the illumination profile.

4. The lighting assembly claim 1, in which:

each of the light redirecting member and the target surface has a respective area;

each region occupies a respective fraction of the area of the target surface; and the area of the light redirecting member is apportioned among the light redirecting zones such each light redirecting zone occupies a fraction of the area of the light redirecting member in proportion to a product of (a) the fraction of the area of the target surface occupied by the region illuminated by the portion of the output light produced by the light redirecting zone, (b) the illuminance within the region, as defined by the illumination profile, and (c) a reciprocal of the intensity of the portion of the intermediate light incident on the light redirecting zone.

5. The lighting assembly of claim 1, in which:

the light redirecting member has a proximal edge adjacent the light input edge of the light guide, and a distal edge remote from the proximal edge; and the light redirecting zones are arrayed between the proximal edge and the distal edge of the light redirecting member.

6. The lighting assembly of claim 1, in which:

the light redirecting member has a proximal edge adjacent the light input edge of the light guide, and a distal edge remote from the proximal edge; and the light redirecting elements in the light redirecting zone near the proximal edge are configured to redirect the intermediate light through a greater turning angle than the light redirecting elements in the light redirecting zone near the distal edge.

7. The lighting assembly of claim 1, in which:

the light redirecting member has a proximal edge adjacent the light input edge of the light guide, and a distal edge remote from the proximal edge; and the light redirecting elements in the light redirecting zone near the distal edge are configured to redirect the intermediate light through a greater turning angle than the light redirecting elements in the light redirecting zone near the proximal edge.

8. The lighting assembly of claim 1, in which:

the light redirecting member has a proximal edge adjacent the light input edge of the light guide, and a distal edge remote from the proximal edge; and the light redirecting elements in the light redirecting zones of the light redirecting member are configured to turn the intermediate light incident thereon through turning angles that have multiple extrema between the proximal edge and the distal edge.

9. The lighting assembly of claim 1, in which:

the illumination profile is a two-dimensional illumination profile defining in respective rows and columns illuminances for respective rows and columns of sub-regions of the target surface;

the light redirecting member has a proximal edge adjacent the light input edge of the light guide, and a distal edge remote from the proximal edge;

the light redirecting zones are divided into light redirecting sub-zones arranged in columns arrayed in a direction parallel to the proximal edge; and within each column, the light redirecting elements within the light redirecting sub-zones are configured to redirect a respective portion of the intermediate light incident thereon through a respective turning angle to produce a respective output light portion directed at a nominal output angle away from the light input edge and the light output surface of the light guide to illuminate a respective column of the target surface with an illumination profile defined by a corresponding column of the two-dimensional illumination profile.

10. The lighting assembly of claim 9, in which within each column of the light redirecting member, the rows correspond in position to the rows of the sub-regions in the corresponding column of the target surface.

11. The lighting assembly of claim 1, in which:

the light redirecting member has an area, a proximal edge adjacent the light input edge of the light guide, and a distal edge remote from the proximal edge;

the area of the light redirecting member is divided into slices arrayed between the proximal edge and the distal edge;

each of the light redirecting zones is divided into light redirecting sub-zones corresponding in number to the slices; and a respective one of the light redirecting sub-zones of each of the light redirecting zones is located in each of the slices.

12. The lighting assembly of claim 11, in which the light redirecting sub-zones of each light redirecting zone are located in different positions in at least two of the slices.

13. The lighting assembly of claim 1, in which:

the light redirecting member has an area and a proximal edge, the proximal edge adjacent the light input edge of the light guide;

the area of the light redirecting member is divided into a two-dimensional array of blocks, the array having rows parallel to the proximal edge;

each of the light redirecting zones is divided into light redirecting sub-zones corresponding in number to the blocks; and a respective one of the light redirecting sub-zones of each of the light redirecting zones is located in each of the blocks.

14. The lighting assembly of claim 13, in which the light redirecting sub-zones of each light redirecting zone are located in different positions in at least two of the blocks.

15. The lighting assembly of claim 13, in which:

the two-dimensional array additionally comprises columns; and the light redirecting sub-zones of each light redirecting zone are located in different positions in the blocks in adjacent ones of the columns.

16. The lighting assembly of claim 1, in which:

the light redirecting member has a proximal edge adjacent the light input edge of the light guide;

each light redirecting zone is divided into one or more zone fragments; and the zone fragments of all light redirecting zones are arranged in a two-dimensional array having rows and columns, the rows parallel to the proximal edge.

17. The lighting assembly of claim 16 in which at least one of the zone fragments has exactly one light redirecting element.

18. The lighting assembly of claim 17, in which:

the light redirecting member additionally has an area; and the area of the light redirecting member within each column of the array is apportioned among the zone fragments corresponding to each light redirecting zone proportionally to an apportionment of the area of the light redirecting member among the light redirecting zones.

19. The lighting assembly of claim 17, in which the zone fragments corresponding to each light redirecting zone are located in different rows in adjacent ones of the columns of the array.

20. The lighting assembly of claim 16, in which the zone fragments corresponding to each light redirecting zone differ in number between adjacent ones of the columns of the array to reduce quantizing effects caused by the non-infinitesimal size of the zone fragments.

21. The lighting assembly of claim 20, in which at least one of the adjacent ones of the columns is devoid of zone fragments corresponding to at least one of the light redirecting zones.

22. The lighting assembly of claim 1, in which the light redirecting zones differ in nominal turning angle of the light redirecting elements.

23. The lighting assembly of claim 1, in which the light redirecting zones differ in slope angle of the light redirecting elements.

24. The lighting assembly of claim 1, in which the light redirecting zones differ in the angular spread of their respective output light portions.

25. The lighting assembly of claim 1, in which the light source comprises solid-state light emitters arranged along the light input edge.

26. The lighting assembly of claim 25, in which the light source is configured to generate light of more than one color.

27. The lighting assembly of claim 26, in which the light source is controllable to vary the emitted light in at least one of intensity and color.

28. The lighting assembly of claim 1, in which the light source comprises solid-state light emitters that are individually controllable.

29. The lighting assembly of claim 1, in which the light redirecting member comprises a film.

30. The lighting assembly of claim 1, in which:

the light redirecting member is a first light redirecting member; and the lighting assembly additionally comprises a second light redirecting member in tandem with the first light redirecting member, the second light redirecting member having light redirecting elements that differ from the light redirecting elements of the first light redirecting member.

31. The lighting assembly of claim 30, in which:

the light redirecting elements of the first light redirecting member are configured to produce part of the turning of the intermediate light emitted from the light guide; and the light redirecting elements of the second light redirecting member are configured to produce the remainder of the turning of the intermediate light received from the first light redirecting member.

32. A lighting assembly to generate output light having a defined light ray angle distribution, the lighting assembly comprising:

a light source;

a light guide edge lit by the light source, the light guide having a light input edge and a light output surface, and comprising light extracting elements to extract light from the light guide through the light output surface as intermediate light, the intermediate light directed away from the light input edge and the light output surface and having a maximum intensity at low ray angles relative to the light output surface;

a light redirecting member positioned to receive the intermediate light, the light redirecting member having opposed major surfaces and comprising light redirecting zones comprising light redirecting elements, in which:

the light redirecting elements within each of the light redirecting zones are collectively configured to redirect a respective portion of the intermediate light incident thereon through a respective turning angle to produce a respective portion of output light directed at a nominal output angle away from the light input edge and the light output surface and having a nominal angular spread;

the light ray angle distribution of the output light results from superposing the portions of the output light produced by all of the light redirecting zones; and the light redirecting zones are relatively sized to weight the intensity, output angle and angular spread of the respective portions of the output light in the light ray angle distribution of the output light.

33. The lighting assembly of claim 32, in which:

the lighting assembly is configured to illuminate a target surface with a defined illumination profile, the target surface having a defined position relationship to the light guide; and the illumination profile defines a respective illuminance in a respective spatial region of the target surface illuminated by each portion of the output light;

each spatial region has an illuminance, location and size defined by the intensity, output angle and angular spread, respectively, of the respective portion of the output light.

34. A light redirecting member to redirect low ray angle incident light to generate output light having a defined light ray angle distribution, the light redirecting member comprising:
- a film substrate having a light input surface, a light output surface opposite the light input surface, and a distal edge; and
- light redirecting zones comprising light redirecting elements at at least one of the light input surface and the light output surface, in which:
- the incident light is incident on the light input surface at low ray angles relative thereto, the incident light having a direction of propagation with a vector component directed towards the distal edge;
- the light redirecting elements within each of the light redirecting zones are collectively configured to redirect a respective portion of the incident light through a respective turning angle to produce a respective portion of the output light directed at a nominal output angle away from the light output surface and towards the distal edge, the portion of the output light having a nominal angular spread;
- the light ray angle distribution of the output light results from superposing the portions of the output light produced by all of the light redirecting zones; and
- the light redirecting zones are relatively sized to weight the intensity, output angle and angular spread of the respective portions of the output light in the light ray angle distribution of the output light.

\* \* \* \* \*